United States Patent
Yamauchi et al.

(10) Patent No.: US 6,535,678 B1
(45) Date of Patent: Mar. 18, 2003

(54) MULTIMODE OPTICAL FIBER WITH A HIGHER ORDER MODE REMOVING FUNCTION

(75) Inventors: Ryozo Yamauchi, Sakura (JP); Tomio Abiru, Sakura (JP); Shoichiro Matsuo, Sakura (JP); Koichi Takahashi, Sakura (JP)

(73) Assignee: Fujikura LTD, Tokyo (JP)

( * ) Notice: Subject to any disclaimer, the term of this patent is extended or adjusted under 35 U.S.C. 154(b) by 0 days.

(21) Appl. No.: 09/701,399

(22) PCT Filed: Mar. 28, 2000

(86) PCT No.: PCT/JP00/01898

§ 371 (c)(1),
(2), (4) Date: Nov. 28, 2000

(87) PCT Pub. No.: WO00/60389

PCT Pub. Date: Oct. 12, 2000

(30) Foreign Application Priority Data

Mar. 31, 1999 (JP) ............................................. 11-094400

(51) Int. Cl.$^7$ ................................................. G02B 6/02
(52) U.S. Cl. ...................................... 385/123; 385/127
(58) Field of Search ................................ 385/123–128, 385/141–145

(56) References Cited

U.S. PATENT DOCUMENTS

| | | | | |
|---|---|---|---|---|
| 4,146,298 A | * | 3/1979 | Szczepanek | ................... 385/28 |
| 4,715,679 A | | 12/1987 | Bhagavatula | |
| 4,828,350 A | * | 5/1989 | Kim et al. | ...................... 385/28 |
| 4,852,968 A | | 8/1989 | Reed | |
| 4,877,304 A | | 10/1989 | Bhagavatula | |
| 4,912,523 A | * | 3/1990 | Refi et al. | ................... 359/116 |
| 5,448,674 A | | 9/1995 | Vengsarkar et al. | |
| 5,483,612 A | | 1/1996 | Gallagher et al. | |
| 5,802,234 A | | 9/1998 | Vengsarkar et al. | |
| 5,835,655 A | | 11/1998 | Liu et al. | |
| 5,852,701 A | | 12/1998 | Kato et al. | |
| 6,134,367 A | * | 10/2000 | Jones et al. | ................... 385/124 |
| 6,278,816 B1 | * | 8/2001 | Keur et al. | .................... 385/29 |
| 6,411,762 B1 | * | 6/2002 | Anthon et al. | ............... 385/123 |

FOREIGN PATENT DOCUMENTS

EP 0 307 228 A2 9/1988

(List continued on next page.)

OTHER PUBLICATIONS

Photonics Technology Letters, A Publication of the IEEE Lasers and Electro–Optics Society Mar. 1994, vol. 6, No. 3, Kamikawa et al., "A Quasi–single Mode Optical Fiber for Long–Haul Transmission in Severe Bending Environments".

"Dispersion Shifted Fiber For WDM Transmission", The Institute of Electronics, vol. 96, No. 335 pp. 43–48 Kato et al.

"Dispersion Shifted Fibers for WDM Transmisssion", The Institute of Electronics, vol. 97, No. 128 pp. 37–42 Matsuo et al.

Australian Official Journal of Patents, Sep. 16, 1999, p. 4944.

Primary Examiner—Akm E. Ullah
Assistant Examiner—Michelle R. Connelly-Cushwa
(74) Attorney, Agent, or Firm—Chadbourne & Parke, LLP

(57) ABSTRACT

The present invention's multimode optical fiber is characterized in that the propagating modes include a mode the lowest and second or higher order modes; and the difference between the propagation constants of the lowest order mode and the second order mode is 2-fold or more than the difference between the propagation constants of adjacent modes that are second order or higher order modes. Due to this design, single mode propagation becomes possible once the modes have propagated over a specific distance. As a result, it is possible to relax the conventional single mode conditions, enabling the fiber parameters to be set relatively freely.

20 Claims, 18 Drawing Sheets

FOREIGN PATENT DOCUMENTS

| | | |
|---|---|---|
| EP | 0 598 554 A1 | 11/1993 |
| EP | 0 724 171 A2 | 1/1996 |
| EP | 0 789 257 A1 | 1/1997 |
| EP | 0 859 247 A2 | 2/1998 |
| EP | 0 866 574 A1 | 3/1998 |
| EP | 0 959 347 A1 | 7/1998 |
| JP | 1-163707 | 6/1989 |
| JP | 6-222235 | 3/1994 |
| JP | 8-248251 | 9/1996 |
| JP | 9-218318 | 8/1997 |
| JP | 10-300965 | 11/1998 |
| JP | 11-72640 | 3/1999 |
| JP | 11-223741 | 8/1999 |
| WO | WO99/30193 | 6/1999 |
| WO | WO99/32909 | 7/1999 |
| WO | WO00/60389 | 10/2000 |

* cited by examiner

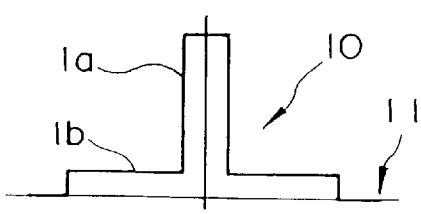
FIG. 5(a)
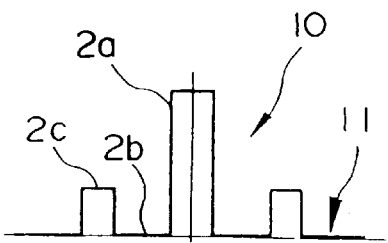
FIG. 5(b)
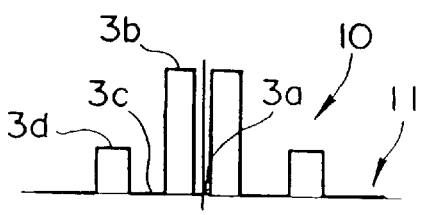
FIG. 5(c)
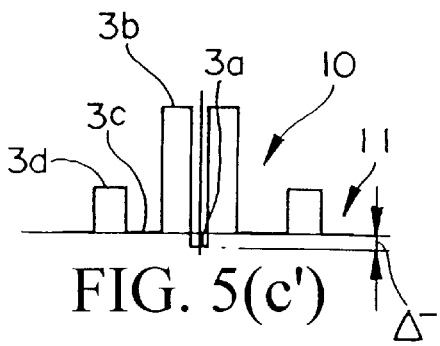
FIG. 5(c')
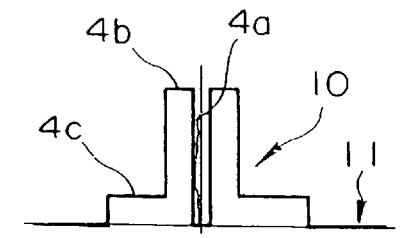
FIG. 5(d)
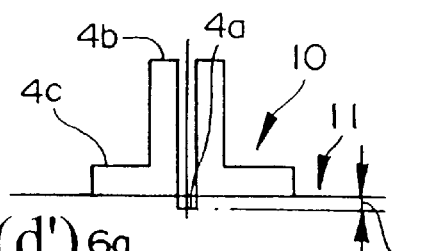
FIG. 5(d')
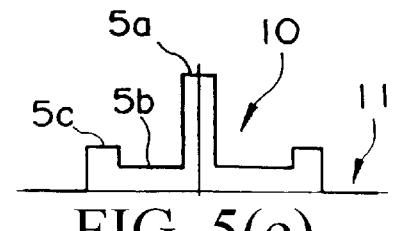
FIG. 5(e)
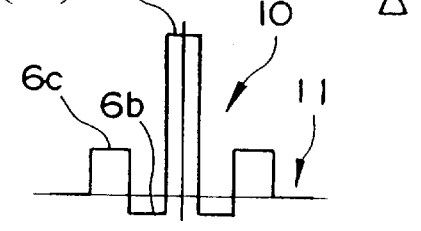
FIG. 5(f)
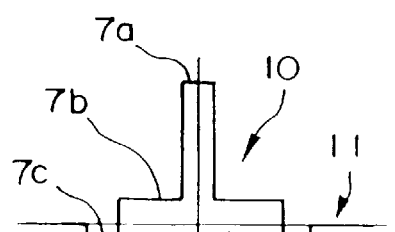
FIG. 5(g)
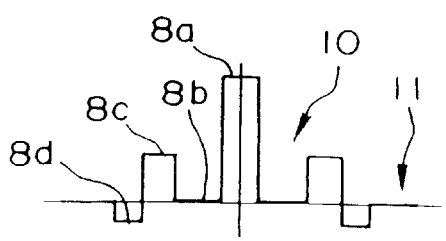
FIG. 5(h)

MULTIMODE OPTICAL FIBER WITH A HIGHER ORDER MODE REMOVING FUNCTION

TECHNICAL FIELD

The present invention relates to an optical fiber used for relatively long-distance transmission, that is mainly applicable to super high-speed transmission or to multiplex transmissions with a high wavelength density.

BACKGROUND ART

Single mode fibers are familiar examples of conventional optical fibers used in high-speed transmission. These single mode fibers for high-speed transmission are usually formed of quartz glass, where the term as employed here shall mean quartz glass having silicon dioxide as the main component. In addition, the quartz glass forming the optical fiber core in this specification is understood to be quartz glass in which at least 50 wt % or more of the composition is silicon dioxide.

A single mode fiber of the simplest structure has a step-refractive index distribution. This step-index single mode fiber is designed with a cladding which is around and in contact with a core. The core has a uniform refractive index and the cladding has a lower refractive index than the core.

The electromagnetic field of a step-index single mode fiber can be determined by solving a Maxwell equation.

If the radius of the core in a cross-section of the optical fiber is designated as a, the refractive index of the core (peak refractive index) is designated as $n_1$, and the refractive index of the cladding is designated as $n_{clad}$ then the core-cladding relative index difference of refraction (i.e., relative refractive index difference) $\Delta$ can be expressed by the following Equation (1)

$$\Delta = (n_1^2 - n_{clad}^2)/(2n_1^2) \quad \text{Equation (1)}$$
$$\approx (n_1 - n_{clad})/n_1 \approx (n_1 - n_{clad})/n_{clad}$$

Setting the light wavelength to $\lambda$, the normalized frequency V can be expressed by the following Equation (2).

$$V=(2\pi/\lambda)an_1(2\Delta) \quad \text{Equation (2)}$$

Single mode conditions enabling only a single LP mode to be propagated are assured provided that this normalized frequency V is below a given set value.

The LP mode (i.e., linearly polarized mode) will now be explained.

The mode which propagates through the optical fiber core is referred to as the "propagating mode" and the mode which propagates through the clad is referred to as the "cladding mode." The cladding mode radiates to the outside as it propagates over a specific distance, and becomes attenuated.

Strictly speaking, the propagating mode consists of modes that have a variety of directional components in the form of electromagnetic field vectors like TE, TM, HE, EH, etc. In a given approximation, or more specifically, under the condition in which the core-cladding relative refractive index difference is small, when perpendicular axes are placed in the fiber's cross-sectional plane, it is possible to approximate the propagation state of the light using an LP mode which has an electromagnetic field vector in only one of the two perpendicular directions. In general, it is said that the relative refractive index difference between the core and the cladding is 1% or less. Provided that slight error is allowed, however, an approximation can be established in the case of a refractive index difference of up to 3%.

The correspondence between the LPmn mode and the strict field mode is as follows.

LP01 mode=HE11 mode
LP11 mode=TE01 mode, TM01 mode, HE21 mode
LP21 mode=EH11 mode, HE31 mode
LP02 mode=HE12 mode In a step-index single mode fiber, it is known that when $V \leq 2.405$, only the lowest order mode (the fundamental mode, i.e., the LP01 mode) meets the single mode conditions for propagating through the core.

As may be understood from Equation (2) above, the disadvantage of this step-index single mode fiber is that, in order to fulfill single mode conditions for a given wavelength $\lambda$, the product of core radius a (or core diameter 2a) and the square root of the relative refractive index difference $\Delta^{1/2}$ cannot be increased. In other words, in order to satisfy single mode conditions, the mode field diameter (MFD), which describes the region in which the mode is present, tends to become smaller in principle. When the MFD is small, however, it is not possible to satisfy the conditions for low-loss connection of plural optical fibers.

On the other hand, if an attempt is made to increase the MFD while maintaining the condition $V \leq 2.405$, it becomes necessary to expand core diameter 2a and thus decrease the relative refractive index difference $\Delta$.

When this type of design is executed, however, the refractive index difference is small, and the mode is large and spreads out from the core center. As a result, if only a slight bend (i.e., a microbend) is applied to in the fiber, loss readily occurs as the energy of the propagating mode passes through the cladding and is radiated to the outside.

Accordingly, as one countermeasure, rather than strictly maintaining the condition $V \leq 2.405$ shown in Equation (2), it is theoretically possible to set V so that a second order mode LP11 mode can be present.

In other words, if a design is provided that permits a value of about 3.0 for V, then there is strong containment of the electromagnetic field inside the core, even when setting the comparatively large MFD of the LP01 mode. For this reason, even if a slight bending is applied to the fiber, the bending loss does not become very large, so that transmission is possible.

Since the LP11 mode is only slightly contained within the core at this time, it does not propagate over long distances, but is attenuated quickly as it propagates over several to dozens of meters due to the large radiating losses from bending that the fiber incurs under the conditions in which it is actually employed. Thus, the LP11 mode does not effect transmission.

However, in a design in which two or more modes propagate in this way, the following problems may occur if the higher order mode does not quickly attenuate.

In general, when there are multiple modes propagating through an optical fiber, the individual modes do not have equivalent propagation speeds. For this reason, when the energy of an optical signal is distributed to a plurality of modes and simultaneously propagated in an optical fiber communications system, the individual modes will arrive at different times following propagation over a long distance, and the signal waveform following demodulation will be distorted. Accordingly, the effective result is that high-speed transmission is not carried out. In recent years, optical communications typically have been carried out at a transmission speed of several Gb/s or more per one wave in the propagation wavelength, with 10 Gb/s being reported on the level of practical applications, and 20~100 Gb/s being reported experimentally. However, the wavelength dispersion (or more simply, "dispersion") in an optical fiber is determined based on the sum of the following two components. Namely, the first component is the material dispersion, which is determined by the material forming the fiber. The second component is the waveguide dispersion (i.e., structural dispersion), which is determined by the structure of the optical fiber's refractive index distribution. In the 1.3~1.6 μm wavelength region which is important for optical fiber communications, the material dispersion of a quartz type optical fiber tends to increase as the wavelength becomes longer. In the above-described typical step-index single mode fiber, the waveguide dispersion contribution is small, with material dispersion dominating. Thus, total dispersion, i.e., the sum of material dispersion and waveguide dispersion, becomes zero near 1.3 μm.

The minimum loss wavelength of an optical fiber, particularly an optical fiber having quartz glass as the main component, occurs at around 1.55 μm. The loss in a quartz optical fiber is mainly due to Rayleigh scattering, and becomes minimal in the 1.55 μm band. Thus, in this wavelength band, a step-index single mode fiber in which V is 2.4~3.0 has a large dispersion and is not very suitable for high-speed transmission.

A dispersion shifted fiber is one in which the wavelength band where dispersion is zero has been shifted to the 1.55 μm band in a single mode fiber consisting of quartz glass. In other words, the absolute value of waveguide dispersion, which is highly dependent on structure, is increased by changing the structure of the refractive index distribution, and the wavelength band at which the total dispersion, i.e., the sum of the material dispersion and the waveguide dispersion, becomes zero is shifted from the 1.3 μm band. Material dispersion is determined by the material itself, and has very little dependence on the waveguide structure.

By making the dispersion in the 1.55 μm band zero in this way, it is possible to carry out transmission with even less loss than in the 1.3 μm band.

Specific values become as follows for example.

The material dispersion of regular quartz glass is roughly 17 ps/km/nm in the 1.55 μm wavelength band. Thus, if the waveguide dispersion is approximately −17 ps/km/nm, this will cancel out material dispersion, so that dispersion can be rendered zero.

In order to increase the absolute value of the waveguide dispersion in this way, the following conditions must be satisfied.

(A) There must be a relatively large relative refractive index difference.

(B) There must be a relatively small core diameter, and the electromagnetic field distribution must have a relatively large spread with respect to the main components of the core.

Condition (A) can be met by designing the core-clad relative refractive index difference to be large.

Condition (B) is roughly synonymous with weak containment of light within the core. It is known in a dispersion shifted fiber that waveguide dispersion tends to increase in the region where $\Delta(MFD)/\Delta\lambda$ has a large value with respect to a $\lambda \rightarrow \lambda + \Delta\lambda$ wavelength change. Thus, in order to increase the waveguide dispersion in a dispersion shifted fiber in accordance with condition (B), it is frequently the case that a design is executed in which the electromagnetic field greatly leaks out from the main part of the core.

However, when the electromagnetic field is large in this way, i.e., in a fiber having a large MFD, the mode greatly spreads out from the center of the core as described above. For this reason, if even a slight bend is applied to the fiber, the energy of the propagating mode is radiated to the outside, and loss readily occurs.

Thus, it is known to be extremely difficult to design a dispersion shifted fiber which simultaneously satisfies this bending loss sensitivity and a dispersion shift to the 1.55 μm band.

Accompanying the advances being made in optical communications technology in recent years, a technique has been realized for carrying out long distance transmission while directly amplifying an optical signal using an optical amplifier. An erbium-doped fiber amplifier (EDFA) is employed as the aforementioned optical amplifier, with the amplified optical signal frequently having a power of 20–100 mW or more.

The 1.55 μm band, which is the low loss region for a dispersion shifted fiber, has a certain wavelength width. In addition, the width of the region amplified by the EDFA has a wavelength width of 20 to 100 nm. A wavelength multiplexing transmission method was therefore realized in which a plurality of different light signals having 20 to 100 wavelengths are set within the 1.55 μm band, and are transmitted in a single dispersion shifted fiber while simultaneously being amplified by the EDFA.

As a result of this type of technological progress, designing the fiber by widening the region (i.e., the effective core cross sectional area) where the light is present in the optical fiber, i.e., widening the MFD, has a significance beyond just the goals of connecting fibers with low loss, increasing the absolute value of waveguide dispersion in an dispersion shifted fiber, etc. Namely, we are referring to the problem of nonlinear effects.

A problem occurs in long-distance transmission in which, when a sufficiently amplified large power optical signal is transmitted over a long distance, the signal waveform of the optical signal becomes distorted due to the influence of nonlinear effects. This problem occurs irrespective of whether or not wavelength multiplex transmission is present.

Self-phase modulation, four-wave mixing (i.e., FWM) and the like may be cited as specific examples of nonlinear effects.

Self-phase modulation is one of the third order nonlinear phenomena that cause refractive index changes in a substance depending on the light intensity. In self-phase modulation, the phase of the optical pulse itself that is propagating through the substance changes abruptly during a short period of time.

In long-distance transmissions, even when transmitting one wave for example, a phenomenon occurs when the peak power of an optical signal is strong in which the glass has a different refractive index at peak positions where power is strongest and valley positions where power is weakest. As a result, localized changes in the instantaneous frequency of the light occur.

Since the change in the instantaneous frequency becomes larger as modulation becomes faster, this becomes linked to the dispersion in the optical fiber and causes a large waveform distortion. Thus, self-phase modulation in a long distance multiplex transmission is an effect that is better referred to as an interaction between self-phase modulation and dispersion in a dispersion shifted fiber.

FWM is also one of the third order nonlinear phenomena. An unnecessary fourth light is generated by three incidenting lights, and the waves of the four frequencies interact to cause an effect on wavelength multiplex communications. It is possible to conceive of an extremely large number of four-wave combinations as the number of wavelength multiplexes increases, so that many of these mutually interact to cause a deterioration in the quality of communication.

The generation efficiency of the unnecessary light (waves) due to FWM can be obtained as an approximation from the following Equation (3).

$$\eta = (\alpha_2 \cdot n_2^2)/(D^2 \cdot A_{\mathit{eff}}^2) \qquad \text{Equation (3)}$$

In this equation, $\alpha$ is the optical fiber loss coefficient (where the units are dB/km, for example), $n_2$ is the nonlinear refractive index of the optical fiber glass, D is the dispersion of the optical fiber, and $A_{\mathit{eff}}$ is the effective core cross-sectional area of the optical fiber.

$A_{\mathit{eff}}$ in Equation (3) can be obtained from the following Equation (4) in the case where the electromagnetic field distribution of the mode propagating through the core is Gaussian.

$$A_{\mathit{eff}} = \pi \cdot MFD^2/4 \qquad \text{Equation (4)}$$

However, as shown in the following Equation (5), $A_{\mathit{eff}}$ is actually calculated by taking the integral of the electromagnetic field distribution of the light in the core.

$$A_{\mathit{eff}} = \frac{\left\{\int_{-\infty}^{\infty}\int_{-\infty}^{\infty} |E(x,y)|^2 dx dy\right\}^2}{\int_{-\infty}^{\infty}\int_{-\infty}^{\infty} |E(x,y)|^4 dx dy} \qquad \text{Equation (5)}$$

As may be understood from Equation (3), as the dispersion of the optical fiber approaches zero, the generation efficiency becomes very large. Thus, from the perspective of high-speed transmission, it is desirable that the dispersion be as small a value as possible. However, on the other hand, a dispersion value that is too small is inconvenient from the perspective of nonlinear effects.

Further, it is preferable that $A_{\mathit{eff}}$ be large. Accordingly, designing the MFD to be large as described above has a significant effect with respect to decreasing nonlinear effects.

In view of the preceding background, recent dispersion shifted fibers have had to satisfy the following conditions.

(A) The absolute value of the dispersion must be small in the employed wavelength band, but may not be completely zero, and should have a value that is deviated to a certain extent (referred to as a "non-zero dispersion shifted fiber").

(B) $A_{\mathit{eff}}$ must be large.

(C) Loss must be low. This is satisfied to some extent if a quartz optical fiber is employed. Specifically, it is preferable that the loss in the 1.55 $\mu$m band be less than about 0.23 dB/km.

(D) Bending loss sensitivity must be small. This occasionally may be inconsistent with the aforementioned second requirement that $A_{\mathit{eff}}$ be large.

DISCLOSURE OF INVENTION

The present invention was conceived in view of the above-described circumstances and has as its objective the provision of an optical fiber having (A) a relatively large $A_{\mathit{eff}}$, (B) low loss, (C) an absolute value for dispersion of around several ps/km/nm in the 1.55 $\mu$m band, and (D) a relatively small bending loss sensitivity in the environment in which the optical fiber is employed.

When employed for wavelength multiplex transmission, it is preferable that (E) broad-band transmission be possible in long distance transmission over several km or more.

In order to resolve the above described problems, the present invention employs the following means.

Namely, the invention according to claim 1 is a multimode optical fiber with a higher order mode removing function, wherein at least three or more linearly polarized wave modes can exist as propagating modes when an optical signal incidents, characterized in that these propagating modes include the lowest mode and second or higher modes, and the difference between the propagation constants of the lowest order mode and the second order mode is 2-fold or more than the difference between the propagation constants of adjacent modes that are second or higher modes.

The invention according to claim 2 is a multimode optical fiber with a higher order mode removing function according to claim 1, characterized in that the difference in the normalized propagation constant between adjacent modes in the second or higher order modes and a cladding mode is 0.25 or less.

The invention according to claim 3 is a multimode optical fiber with a higher order mode removing function according to claim 1, characterized in that said multimode optical fiber is provided with a core and a cladding which is around and in contact with this core, the core consists of two or more layers provided in a concentric form, and is equipped with a maximum refractive index layer that has the highest refractive index and is provided near the center of the core, and an intermediate layer that has a refractive index that is lower than that of the maximum refractive index layer and is around and in contact with the maximum refractive index layer.

The invention according to claim 4 is a multimode optical fiber with a higher order mode removing function according to claim 3, characterized in that the maximum value of the relative refractive index based on the cladding of the intermediate layer is 5~90% of the relative refractive index based on the cladding of the maximum refractive index layer.

The invention according to claim 5 is a multimode optical fiber with a higher order mode removing function according to claim 3, characterized in that the difference in the relative refractive index difference based on the refractive index of the cladding in the maximum refractive index layer is in the range of 0.65~1.5%.

The invention according to claim 6 is a multimode optical fiber with a higher order mode removing function according to claim 3, characterized in that the outer diameter of the core is 3~8-fold greater than the outer diameter of the maximum refractive index layer.

The invention according to claim 7 is a multimode optical fiber with a higher order mode removing function according to claim 3, characterized in that the outer diameter of the core is 3~5.5-fold greater than the outer diameter of the maximum refractive index layer.

The invention according to claim 8 is a multimode optical fiber with a higher order mode removing function according to claim 3, characterized in that the intermediate layer consists of one layer or two or more layers having different refractive indices, and, when the refractive indices of the layers forming the intermediate layer are designated nl1, nl2, ..., nli (i=2, 3, ...) starting from the inside, nl1>nli, and the cladding is provided with a refractive index lower than nl1.

The invention according to claim 9 is a multimode optical fiber with a higher order mode removing function according to claim 8, characterized in that the maximum value of the relative refractive index based on the cladding of the intermediate layer is 5~50% of the relative refractive index based on the cladding of the maximum refractive index layer.

The invention according to claim 10 is a multimode optical fiber with a higher order mode removing function according to claim 3, characterized in that the intermediate layer consists of two or more layers having different refractive indices, and, with respect to the layers forming the intermediate layer, when the refractive index of the layer adjacent to the maximum refractive index layer is designated nl1 and the maximum refractive index of these layers is designated nlmax, then nlmax>nl1; and the cladding is provided with a refractive index lower than nlmax.

The invention according to claim 11 is a multimode optical fiber with a higher order mode removing function according to claim 10, characterized in that the maximum value of the relative refractive index based on the cladding of the intermediate layer is 15~90% of the relative refractive index based on the cladding of the maximum refractive index layer.

The invention according to claim 12 is a multimode optical fiber with a higher order mode removing function according to claim 1, characterized in that modes other than the lowest order mode are attenuated during the time that an incidented light signal is propagating a maximum of 4 km, and do not essentially contribute to data transmission.

The invention according to claim 13 is a multimode optical fiber with a higher order mode removing function according to claim 1, characterized in that the effective core cross sectional area in the 1.55 $\mu$m band is 50 $\mu m^2$ or more, the absolute value of dispersion in 1.55 $\mu$m band is 10 ps/km/nm or less, and the main component is quartz glass.

The invention according to claim 14 is a multimode optical fiber with a higher order mode removing function according to claim 13, characterized in that the effective core cross sectional area in the 1.55 $\mu$m band is 70 $\mu m^2$ or more.

The invention according to claim 15 is a multimode optical fiber with a higher order mode removing function according to claim 14, characterized in that the absolute value of dispersion in 1.55 $\mu$m band is 5 ps/km/nm or less.

The invention according to claim 16 is a multimode optical fiber with a higher order mode removing function according to claim 1, characterized in that the number of propagating modes is 3~6.

The invention according to claim 17 is a multimode optical fiber with a higher order mode removing function according to claim 1, characterized in that in the employed wavelength band, dispersion of the lowest order mode becomes zero at a wavelength longer than 1.5 $\mu$m.

The invention according to claim 18 is a multimode optical fiber with a higher order mode removing function according to claim 1, characterized in that the uniform bending loss for a diameter of 20 mm in the employed wavelength band is 30 dB/m or less.

The invention according to claim 19 is a multimode optical fiber with a higher order mode removing function according to claim 1, characterized in that the uniform bending loss for a diameter of 20 mm in the employed wavelength band is 10 dB/m or less.

The invention according to claim 20 is a multimode optical fiber with a higher order mode removing function according to claim 1, characterized in that in the employed wavelength band, dispersion of the lowest order mode becomes zero at a wavelength shorter than 1.5 $\mu$m.

The present invention's multimode optical fiber with a higher order mode removing function is not particularly restricted. However, since the present invention intends to provide a design suitable to long-distance transmission, a presumption is made that the invention will be employed in the 1.55 $\mu$m band as a general rule. This 1.55 $\mu$m band has a wavelength range of 1490~1620 nm.

In addition, while the effective core cross sectional area, bending loss and the like are not particularly restricted, as a general rule, these are values measured in the employed wavelength band of 1.55 $\mu$m.

BRIEF DESCRIPTION OF THE DRAWINGS

FIGS. 5(a)~5(h) are graphs showing examples of refractive index distributions for the present invention's optical fiber.

FIG. 20(*b*) is an explanatory diagram showing the effect of a fiber grating.

BEST MODE FOR CARRYING OUT THE INVENTION

Figure 1:
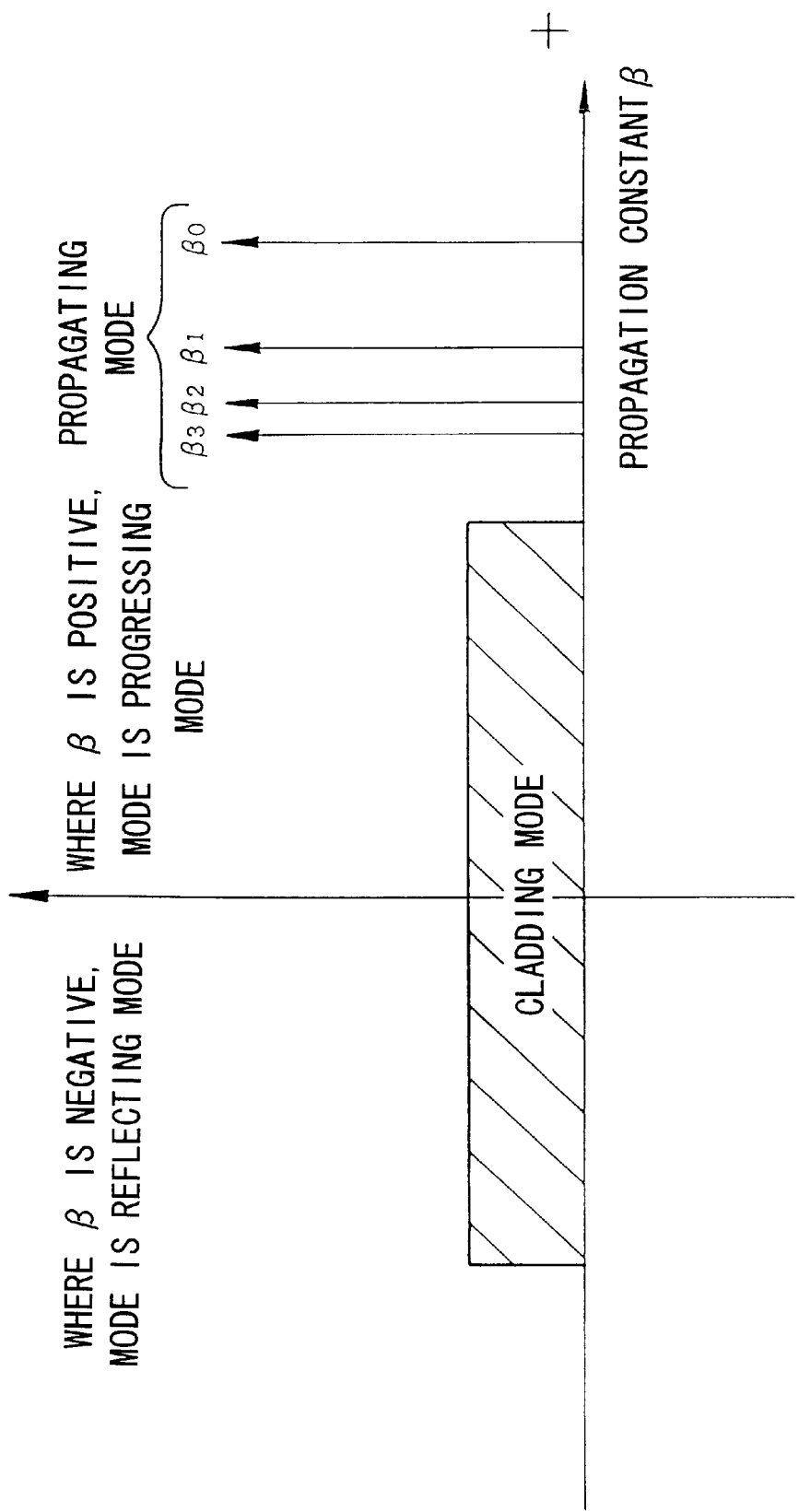
FIG. 1 is a graph employing a β diagram to show the limits within which the propagating modes of the optical fiber are present.

As discussed above, the conventional approach in step-index single mode fibers has been to employ a means in which single mode conditions are relaxed slightly by setting V to about 3.0, so that the LP01 mode is more strongly contained, and the relatively more weakly contained LP11 mode is quickly attenuated, for example.

This type of optical fiber is sometimes referred to as a "quasi-single mode fiber".

The present invention's multimode optical fiber sets conditions to enable propagation of more modes than a quasi-single mode fiber, and sets an appropriate relationship between the optical fiber's refractive index distribution and the difference in propagation constants between modes, so that a design capable of essential single mode transmission is executed.

The basic concept of the present invention's multimode optical fiber is to use the mode changes that occur due to bending caused by the environment in which the optical fiber is employed.

The ideal optical fiber assumes that the outer and core diameters do not change, and there is not the fluctuation of the refractive index along the length of the fiber.

Accordingly, even if a plurality of modes propagates through this optical fiber, there is no exchange of energy between the modes.

However, in reality, an optical fiber is subject to the following disturbances due to the environment in which it is installed.

(A) Changes of the outer and core diameters, and fluctuations of the refractive index are present intrinsically in the optical fiber itself.

(B) Optical fibers are typically employed as resin-coated optical fibers in which a coating layer consisting of a synthetic resin has been applied around the periphery of the fiber for protection of its outer surface. This coating layer is typically a two-layer structure consisting of a soft inner layer and a hard outer layer. This coating layer is also subject along its length to changes in diameter as well as in the hardness of the resin. These changes will have an effect on the optical fiber.

(C) When forming optical fibers into a cable, the optical fibers may be taped or twisted together. The optical fibers are subject to bending, pulling, and compression as a result of these operations.

As a result of these disturbances, energy exchanges occur between the modes that are propagating through the optical fiber. This is referred to as "mode conversion".

The degree of mode conversion is expressed as the difference $\Delta\beta$ between the propagation constants $\beta_i$ and $\beta_j$ for the two modes that are participating in a coupling. $\Delta\beta$ may be expressed by the following Equation (6).

$$\Delta\beta = |\beta i - \beta j| \qquad \text{Equation (6)}$$

As shown in the following Equation (7), the coupling coefficient $C_{ij}$ of these modes is said to be proportional to $\Delta\beta^{-2P}$ $$C_{ij} \Delta\beta^{-2P} \qquad \text{Equation (7)}$$

Here, p is a quantity related to the spectrum in the longitudinal direction of the fluctuation, and takes a value of around 2~4.

FIG. 1 employs a $\beta$ diagram to show the limits within which the propagating mode exists. The propagation constant is shown along the horizontal axis. The mode in the area in which $\beta$ is positive is the mode in the direction of progression of the optical signal, and the mode in the area in which $\beta$ is negative is the opposing reflected mode.

Where employing a qualitative explanation, the LP01 mode propagation constant is set to $\beta_0$, and the propagation constants for modes higher than LP01 are sequentially set to $\beta_1, \beta_2, \ldots$, as shown in FIG. 1.

For example, in the above discussion, when p=4, the coupling coefficient between modes is inversely proportional to the $8^{th}$ power of $\Delta\beta$. There are three propagating modes (the LP01, LP11, LP02 modes) present in this example. Their respective propagation constants are $\beta_0$, $\beta_1$, and $\beta_2$ as described above. These propagation constants are set so as to satisfy the conditions expressed by the following Equations (8) and (9).

$$\beta_1 - \beta_2 > 3 \cdot (\beta_1 - \beta_2) \qquad \text{Equation (8)}$$

$$\beta_1 - \beta_2 = \beta 2 - k_o n_{clad} \qquad \text{Equation (9)}$$

Where, in Equation (9), $k_o$ is the propagation constant for light in a vacuum expressed by the following Equation (10), and $n_{clad}$ is the refractive index of the cladding.

$$k_o = 2\pi/\lambda \qquad \text{Equation (10)}$$

From Equation (7) above, the relationship between the coupling coefficients of these modes can be expressed by Equations (11) and (12) as follows.

$$C_{01} < 0.0002 C_{12} \qquad \text{Equation (11)}$$

$$C_{12} \approx C_{2clad} \qquad \text{Equation (12)}$$

As may be understood from Equations (11) and (12), hardly any coupling occurs between the LP01 and LP11 modes, while coupling does occur between the higher order modes (i.e., between the LP11 and LP02 modes) and between the highest mode (LP02 mode) and the cladding mode.

Therefore, the LP11 mode is strongly coupled to the LP02 mode, and is also coupled to the cladding mode. As a result, the LP11 mode is quickly attenuated after propagating through the clad and progressing over a specific distance.

Thus, even if a plurality of modes are in a state capable of propagating through the core, the propagation constant for each mode is appropriately controlled and LP11 or higher order modes are actively removed due the effect of the disturbances described above. As a result, once the modes have propagated over a suitable distance, a mode distribution is enabled in which essentially only the LP01 mode will propagate.

The coupling coefficient between modes is not strictly determined simply by $\Delta\beta$ alone. Rather, the coupling coefficient depends greatly on the electromagnetic field distribution of the two modes contributing to the coupling, the shape and periodicity of the disturbance applying to the optical fiber as the perturbation, and the like.

Those skilled in the art of rendering optical fibers into cables are well aware that Δβ is highly significant from the perspective of an increase in transmission loss. As shown by Equations (8) and (9) above, the relationship between propagation constant differences and increasing transmission loss is extremely dependent on Δβ such that it is proportional to the $-4^{th}$ power~$-8^{th}$ power depending on the value of p, and the effect of Δβ is large as compared to other factors.

However, it is the objective of the present invention's multimode optical fiber, which is capable of propagating a plurality of modes through its core, to excite a plurality of LP modes, propagate these modes through the optical fiber, and then actively remove LP11 or higher order modes during propagation. For this reason, not only Δβ, but also the shape and periodicity of the disturbances applied to the multimode optical fiber are factors that greatly affect the optical fiber's characteristics. Since the shape and periodicity of disturbances will differ according to the individual optical fibers, generalities cannot be made. However, the disturbances employed to obtain the effects of the present invention arise from intrinsic factors associated with the optical fiber itself and extrinsic factors associated with the installation during handling of a typical optical fiber.

For example, axial symmetry is extremely important in the shape of the disturbance. The shape of a number of disturbances generated in a multimode optical fiber when designed as indicated in the preceding Equations (8), (9), (11) and (12), and the mode coupling relationship at that time will now be qualitatively exemplified below.

Figure 2:
FIG. 2 is a perspective view showing an optical fiber in which a microbend has occurred.

For example, when a microbend such as shown in FIG. 2 occurs in an optical fiber, the axis of the optical fiber, which was originally straight, becomes bent. As a result, a "non-axially symmetrical perturbation" is applied to the optical fiber. The LP01 mode is an axially symmetrical mode. For this reason, if only axially symmetrical perturbations, such as a change in the optical fiber's core diameter, are present in an optical fiber in which no microbending has occurred, then the LP01 mode will couple with the same axially symmetrical mode LP02.

However, coupling with the non-axially symmetrical LP11 mode may dominate over coupling between the LP01 and LP02 modes depending upon how strongly a non-axially symmetrical perturbation, such as a microbend, is applied. The LP11 mode couples not only with the LP01 mode, but also with the LP02 mode.

Figure 3:
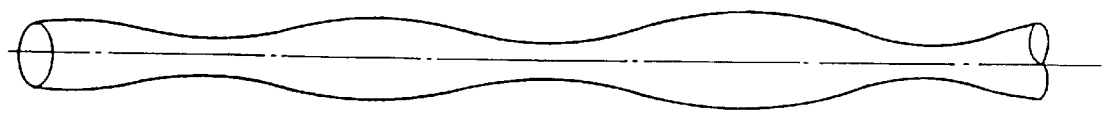
FIG. 3 is a perspective view showing an optical fiber in which the fiber diameter is varying along the direction of its length.

When there is only a so-called "axially symmetrical perturbation", such as a change in diameter of the optical fiber along the fiber's length as shown in FIG. 3, then, unlike the case of microbends as discussed above, a coupling is believed to occur between modes having the same symmetry.

In other words, coupling combinations such as the LP01 made and the LP02 mode, the LP11 mode and the LP12 mode, etc., may be considered.

Specifically, so that the desired disturbance is applied in the present invention's multimode optical fiber, the Young's modulus of the inner layer material is set to be 0.5 kg/mm² or less, and preferably to be in the range of 0.05~0.3 kg/mm², and the Young's modulus of the outer layer material is set to be 30 kg/mm² or more, and preferably to be in the range of 60~70 kg/mm². By satisfying these limits, a suitable disturbance arising from the difference in hardness between the inner and outer layers—which is probably caused in the resin curing process during manufacture of the optical fiber—can be applied to the optical fiber, thereby improving the effect of removing higher order modes.

The design of the present invention's multimode optical fiber can be arranged as follows.

(A) A refractive index distribution structure is designed so that at least three or more linearly polarized modes can be present as propagating modes when incidenting a light signal (i.e, during excitation). As a result there is a greater degree of freedom in the design of the optical fiber.

(B) The difference between the propagation constants of the LP01 mode and the LP11 mode at this time is designed to be 2-fold or more, and preferably 3-fold or more, greater than the difference between the propagation constants of the LP11 or higher order modes and the higher adjacent modes. As a result, only LP11 or higher modes couple with the cladding mode, so that, after propagating over a suitable distance, a mode distribution is enabled in which essentially only the LP01 mode is propagated. When the difference in propagation constants is less than 2-fold, it is not possible to appropriately attenuate only the higher order modes. As a result, single mode propagation does not result.

(C) The propagation constant difference between adjacent modes for the LP11 or higher order modes and the cladding mode is set so that, for normalized propagation constants, the difference is 0.25 or less, preferably 0.1 or less, and more preferably 0.05 or less. By setting the propagation constant difference in this way, higher order modes are quickly coupled to the cladding mode, and are eliminated after propagating over a distance that is not problematic for the system.

The appropriate distance depends on the type of optical fiber. However, a sufficiently applicable transmission system can be constructed if the higher order modes have been eliminated by the time the modes have propagated over about 4 km.

Provided that modes other than the LP01 are attenuated by, preferably, 20 dB or more when propagating beyond 4 km, then these modes will not substantially contribute to data transmission.

For example, an optical undersea transmission system is formed by sequentially connecting a plurality of optical fibers as needed, with the continuous length of one optical fiber being a minimum of 3~4 km. Therefore, if unnecessary higher order modes are sufficiently attenuated while propagating through one multimode optical fiber, it is possible to realize an essentially single mode propagation state by the time the propagation arrives at the next connection point.

However, the conditions indicated under (A), (B) and (C) above cannot be freely taken for all optical fiber refractive index distribution structures.

Figure 4:
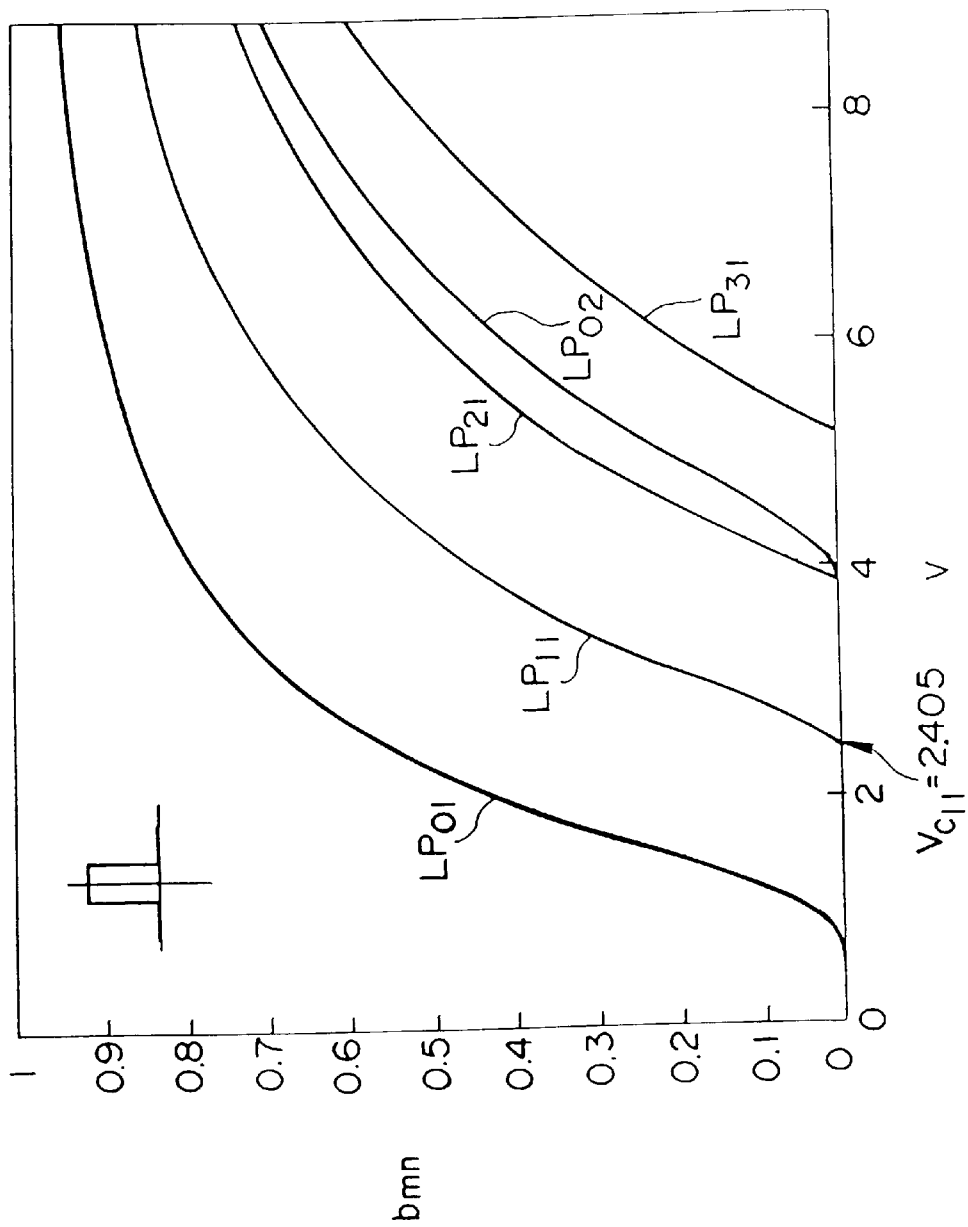
FIG. 4 is a graph showing the relationship between the normalized frequency V of an optical fiber having a step-refractive index distribution and a normalized propagation constant bmn.

FIG. 4 is a graph showing the relationship between a normalized propagation constant bmn and the normalized frequency V in an optical fiber having a step-refractive index distribution.

bmn is the value obtained when the propagation constant βmn of the LPmn mode is normalized, and is approximated by the following equation.

$$bmn = (\beta mn - k_0 n_{clad})/(k_0 n_1 - k_0 n_{clad}) \qquad \text{Equation (13)}$$

Here, βmn is the propagation constant of the LPmn mode (where m and n are integers).

With respect to propagation constants hymn and normalized propagation constants bmn, the relative size difference between propagation constants, is approximately equal to the relative size difference between their normalized propagation constants.

Here, the relative refractive index Δ, which is the relative difference between the clad refractive index and the peak refractive index of the core, is expressed by the following Equation (14).

$$\Delta \approx (n_1 - n_{clad})/n_{clad} \quad \text{Equation (14)}$$

Taking the above into consideration, the relationship between βmn and bmn can be approximately expressed by the following Equation (15).

$$\beta mn \approx (1+bmn)k_o n_{clad} \quad \text{Equation (15)}$$

If the difference between the two propagation constants is designated Δβmn, m'n', then this difference can be expressed by the Equation (16) below.

$$\Delta \beta mn, m'n' = (bmn - bm'n')k_o n_{clad} \quad \text{Equation (16)}$$

In the graph shown in FIG. 4, the second LP mode (LP11 mode) is generated when the normalized frequency V is greater than 2.405. Accordingly, VC11, which is the upper limit for the normalized frequency in the range in which LP11 mode propagation can be eliminated, is 2.405. In addition, when V exceeds 3.8, the next LP mode is generated. Specifically, the LP21 and LP02 modes are generated at this time.

b01 and b11 for the LP01 mode and LP11 mode respectively are already large values in the range within which these third and fourth LP modes are generated. Thus, it may be understood from the formula for bmn that the values of β01 and β11 are large values.

Table 1 shows the bmn values for the LP01 and LP11 modes corresponding to a V that is very close to where the LP21 mode and the LP02 mode are generated.

TABLE 1

| mode number | Bmn |
|---|---|
| $LP_{01}$ | 0.76 |
| $LP_{11}$ | 0.42 |
| $LP_{02}$ | 0 |
| $LP_{21}$ | 0 |

From Table 1 it may be seen that the difference in the normalized propagation constants between the LP01 mode and the LP11 mode is 0.34. In contrast, the difference in the normalized propagation constants of the LP11 mode and the LP02 mode is 0.42. In other words, there is not a 2.5 fold difference and, moreover, the size relationship has been reversed.

Accordingly, it is difficult to set the difference between the propagation constants of LP01 mode and the LP11 mode to be 2.5 fold or greater than the difference in the propagation constants between the second or higher order modes. Thus, even if a state was created in which three or more LP modes could be propagated, it is not possible to create the desired relationship between propagation constant differences in a design having a step-refractive index distribution.

Even if a microbend of the type that would assist mode conversion in an optical fiber is applied in the case of this type of relationship in propagation constant differences between modes, a very strong coupling is generated between the LP01 and LP11 modes, which have a small propagation constant difference to begin with. Accordingly, it is ultimately not possible to remove the unnecessary modes and leave only the LP01 mode remaining exclusively.

The present inventors therefore investigated a number of other refractive index distributions. As a result of these efforts, it was discovered that conditions (A), (B) and (C) as disclosed above can be satisfied with a multimode optical fiber that has a refractive index distribution in which has a core and a cladding which is around and in contact with that core, the core consisting of two or more layers provided in a concentric shape, a maximum refractive index layer, having the highest refractive index is provided near the center of the core, and an intermediate layer, having a lower refractive index than the maximum refractive index layer, which is around and in contact with the maximum refractive index layer.

It is preferable to provide the following type of refractive index distribution in this case.

(1) The intermediate layer consists of one layer, or two or more layers having different refractive indices. If the refractive indices of the layers forming the intermediate layer are designated as nl1, nl2, ... nli (where i=2, 3...) starting from the inside, then nl1>nli. Further, the cladding is provided with a refractive index that is less than nl1.

In this refractive index distribution, the maximum value of the relative refractive index based on the cladding of the intermediate layer is preferably in the range of 5~50% of the relative refractive index based on the cladding of the maximum refractive index layer.

(2) The intermediate layer consists of two or more layers having different refractive indices. Of the layers forming this intermediate layer, the refractive index of the layer adjacent to the maximum refractive index layer is designated as nl1, and the maximum refractive index of these layers is designated as nlmax. In this case then, nlmax>nl1. Further, the cladding is provided with a refractive index that is lower then nlmax.

In this refractive index distribution, the maximum value of the relative refractive index based on the cladding of the intermediate layer is preferably in the range of 15~90% of the relative refractive index based on the cladding of the layer with the maximum refractive index.

FIGS. 5(a)–5(h) show specific examples of this type of refractive index distribution. In these refractive index distributions, the location from the center of the core is shown along the horizontal axis and the refractive index is shown along the vertical axis.

The refractive index distribution shown in FIG. 5(a) is obtained in the case of a core 10 that consists of a center part 1a and a stepped part 1b. Stepped part 1b is provided around and has a lower refractive index than center part 1a. A cladding 11 is around and in contact with the stepped part 1b. Cladding 11 has a lower refractive index then stepped part 1b.

The refractive index distribution shown in FIG. 5(b) is obtained in the case of a core 10 that consists of a center part 2a and, in sequence around this center part 2a, an intermediate part 2b, which has a lower refractive index than center part 2a, and a ring part 2c, which has a higher refractive index than intermediate part 2b and a lower refractive index than center part 2a. A cladding 11, which has a refractive index that is roughly equal to intermediate part 2b, is provided around this ring part 2c.

The refractive index distribution show in FIG. 5(c) is obtained in the case of a core 10 that consists of a center part 3a and, in sequence around this center part 3a, a first ring part 3b that has a higher refractive index than center part 3a; an intermediate part 3c that has a refractive index that is the same as center part 3a; and a second ring part 3d that has a higher refractive index than intermediate part 3c and a lower refractive index than first ring part 3b. A cladding 11 having a refractive index that is roughly equal to intermediate part 3c is provided around this second ring part 3d.

The refractive index distribution shown in FIG. 5(d) is obtained in the case of a core 10 that consists of a center part 4a and, in sequence around this center part 4a, a first ring part 4b that has a higher refractive index than center part 4a, and a stepped part 4c that has a higher refractive index than center part 4a and a lower refractive index than first ring part 4b. A cladding 11 having a refractive index that is roughly equal to center part 4a is provided around this stepped part 4c.

The refractive index distribution in FIGS. 5(c') and 5(d') show modifications in which the refractive indices of center parts 3a and 4a in FIGS. 5(c) and 5(d) respectively have been set to be just $-\Delta$ lower than the refractive index of cladding 11.

The refractive index distribution shown in FIG. 5(e) is obtained in the case of a core 10 that consists of a center part 5a, and in sequence around this center part 5a, an intermediate part 5b that has a lower refractive index than this center part 5a, and a ring part 5c having a higher refractive index than intermediate part 5b and a lower refractive index than center part 5a. A cladding 11 having a refractive index that is lower than that of intermediate part 5b is provided around ring part 5c.

The refractive index distribution shown in FIG. 5(f) is obtained in the case of a core 10 that consists of a center part 6a and, in sequence around center part 6a, an intermediate part 6b having a lower refractive index than center part 6a, and a ring part 6c having a higher refractive index than intermediate part 6b and a lower refractive index than center part 6a. A cladding 11 having a higher refractive index than intermediate part 6b and a lower refractive index than ring part 6c is provided around this ring part 6c.

The refractive index distribution shown in FIG. 5(g) is obtained in the case of a core 10 that consists of a center part 7a and, in sequence around center part 7a, a stepped part 7b that has a lower refractive index then this center part 7a, and a low refractive index part 7c that has a lower refractive index than stepped part 7b. A cladding 11 having a refractive index that is higher than that of low refractive index part 7c and lower than that of stepped part 7b is provided around low refractive index part 7c.

The refractive index distribution shown in FIG. 5(h) is obtained in the case of a core 10 and cladding 11. Core 10 is formed so that there is a center part 8a, around which an intermediate part 8b, that has a lower refractive index then center part 8a, a ring part 8c, that has a higher refractive index than intermediate part 8b and a lower refractive index than center part 8a, and a low refractive index part 8d, that has a lower refractive index than cladding 11, are provided in sequence.

Each of the compositional elements of the refractive index distributions shown in FIGS. 5(a) through 5(h) employ quartz glass as the main component, and are composed of pure quartz glass, quartz glass doped with germanium, which serves to increase the refractive index or quartz glass doped with fluorine, which serves to decrease the refractive index.

The refractive index distributions shown in FIGS. 5(a) through 5(h) have in common that a cladding 11 is around and in contact with a core 10, and that core 10 has a part disposed near its center that has the highest refractive index in the refractive index distribution (i.e., the maximum refractive index layer), and a intermediate layer that is disposed around and in contact with this maximum refractive index layer and in between the maximum refractive index layer and cladding 11, this intermediate layer having a lower refractive index than the maximum refractive index layer.

The refractive index distributions shown in FIGS. 5(a), 5(d) and 5(g) have in common that they are essentially three layer structures, assuming that the provision of the low refractive index center part 4a shown in FIG. 5(d), and the low refractive index part 7c around stepped part 7b shown in FIG. 5(g) is optional.

In other words, these refractive index distributions are formed by providing maximum refractive index center parts 1a, 7a and first ring part 4b near the center (i.e., first layer: maximum refractive index layer), providing lower refractive index stepped parts 1b, 4c, and 7b around and in contact with parts 1a, 4b and 7a (i.e., second layer: intermediate layer), and providing a cladding 11 (cladding layer) which has a lower refractive index than stepped parts 1b, 4c and 7b to the outer periphery of stepped part 1c, 4c, and 7b. Whether or not to provide a low refractive index center part 4a to the center of core 10, and a low refractive index part 7c around the outer part of core 10 that is in contact with cladding 11 is optional, and depends on the required properties of the design.

In these refractive index distributions, when the maximum values of the relative refractive indices of the first and second layers based on the cladding layer are designated as $\Delta 1$ and $\Delta 2$, then it is preferable that $\Delta 2$ be in the range of 5~50%, and even more preferably in the range of 5~15%, of $\Delta 1$.

The refractive index distributions shown in FIGS. 5(b), 5(c), 5(e), 5(f) and 5(h) have in common that they are essentially four-layer-structures, assuming that the provision of the low refractive index center part 3a shown in FIG. 5(c) and low refractive index part 8d shown in FIG. 5(h) is optional.

In other words, in these refractive index distributions, center part 2a, first ring part 3b, and center parts 5a, 6a, and 8a are provided at the center and have a maximum refractive index (i.e., first layer: maximum refractive index layer); intermediate parts 2b, 3c, 5b, 6b, and 8b are provided around and have a lower refractive index than center part 2a, first ring part 3b, and center parts 5a, 6a, and 8a (i.e., second layer: intermediate layer); ring part 2c, second ring part 3d, and ring parts 5c, 6c, and 8c are provided around and have a higher refractive index than intermediate parts 2b, 3c, 5b, 6b and 8b (i.e., third layer: intermediate layer); and a cladding 11 is provided around the aforementioned (i.e., cladding layer).

The provision of center part 3a and low refractive index part 8d is optional and depends on the required properties of the design. The relative refractive index of low refractive index part 8d based on the refractive index of cladding 11 is in the range of $-5\%~-15\%$ with respect to the maximum value ($\Delta 1$) of the refractive index near the center of core 10.

Similarly, the relative refractive index of the third layer is in the range of 15~90% of $\Delta 1$.

Similarly, the relative refractive index of intermediate layer 5b is $0~-15\%$ of $\Delta 1$.

Similarly, the relative refractive index of intermediate layer 6b is $0~-10\%$ of $\Delta 1$.

In the refractive index distributions shown in FIGS. 5(c') and 5(d'), it is preferable from the perspective of manufacturability that the value of the refractive index of center parts 3a, 4a be around $-0.05~0.3\%$ based on the relative refractive index with respect to cladding 11.

The refractive index distributions shown in FIGS. 5(a)~5(h) have in common that core 10 is consisted of two or more layers, and that a maximum refractive index layer, which has the highest refractive index is disposed near the center of core 10, and an intermediate layer, which has a lower refractive index than the maximum refractive index layer, surrounds and is in contact with the maximum refractive index layer. In this way, the preceding conditions can be satisfied by concentrating the LP01 mode in the high refractive index portion at the center of core 10, especially.

Single mode fibers having the refractive index distributions shown in FIGS. 5(a)~5(h) have been conventionally available. However, the normalized frequency V of these is set to be a small value in order to control generation of the LP11 mode. Thus, in actuality, conventional designs have observed very strict single mode conditions.

The present invention attempts to take away these types of limitations by providing a mode arrangement in which, even when numerous modes are propagating, the LP11 or higher order mode are scattered to radiating modes and eliminated after propagating over an appropriate distance, due to the effect of mode conversion. As a result, even if its refractive index distributions are the same as that of conventional designs, the present invention's design requirements are different.

Qualitatively, when the maximum refractive index layer's (i.e., the first layer's) refractive index (i.e., the peak refractive index of the core) is designated as n1, then, for example, the maximum refractive index of the intermediate layer around and in contact with this maximum refractive index layer is designated at n2. Designating the relative refractive indices of n1 and n2 based on the refractive index of cladding 11 as $\Delta 1$ and $\Delta 2$, respectively, the requirements for the present invention can be satisfied by setting $\Delta 2$ to be 5~90%, and preferably about 30%, of $\Delta 1$. Note that n1 is 0.5~1.5%.

The reason why the present invention can be realized with this degree of refractive index difference is because, with the exception of the LP01 mode, very little of the energy distribution of the LP modes propagating through the multimode optical fiber exist in the region of this maximum refractive index layer in the center part of the fiber. The propagation constant for modes other than the LP01 mode is therefore not very dependent on the refractive index of the maximum refractive index layer.

The outer diameter of the core with respect to the outer diameter of the maximum refractive layer is 3~8 fold, and preferably 3~5.5 fold, greater.

However, as in the case of typical multimode fibers, it becomes impossible to establish these types of conditions when V becomes large in the case where 20 to 30 LP modes are present. Accordingly, in the present invention, the value of the upper limit of the propagating mode number is set so that it satisfies conditions such that the propagation constant is not dependent on the refractive index of the portion of the core center that has the highest refractive index in other words, in order to realize this type of behavior for the present invention's multimode optical fiber, it is preferable to have the refractive index distribution shown in FIGS. 5(a)~5(h), and that the number of LP modes from among the propagating modes be around 3~6, or 3~5 depending on the circumstances.

Thus, the conventional single mode conditions have been relaxed for the present invention's multimode optical fiber. As a result, the present invention is able to more flexibly respond to the optical characteristics required of an optical fiber that is employed in a transmission system. In addition, the values of these characteristics can be adjusted according to design requirements such as the refractive index distribution and the like.

For example, in the case of the wavelength multiplexing transmission systems that have been extensively developed in recent years, the absolute value of dispersion in the employed wavelength band must be 10 ps/km/nm or less, and preferably, 5 ps/km/nm or less. However, in order to reduce the FWM (four-wave mixing) effect, a totally zero dispersion is not desirable. Moreover, since dispersion values are determined taking the transmission distance and the transmission speed into consideration, these values are not absolutes.

In the present invention's multimode optical fiber enables a design in which the dispersion of the LP01 mode becomes zero at wavelengths that are longer than the employed wavelength band, or the dispersion value in the employed wavelength band is controlled to be within the above range. This design is effective for use in a long distance transmission system such as exemplified by undersea cable. Further, the present invention's multimode optical fiber enables a design in which the dispersion of the LP01 mode becomes zero at wavelengths shorter than the employed wavelength band, the dispersion value in the employed wavelength band is controlled to be within the above range. As a result, the present invention enables a design which is flexible according to the transmission system.

It is preferable that $A_{\it eff}$ be large. For example, by employing the present invention, an optical fiber can be obtained that has an $A_{\it eff}$ of 50 $\mu m^2$ or more, and preferably 70 $\mu m^2$ or more.

It is also desirable that bending loss sensitivity be small. When an optical fiber uniformly wrapped to a diameter of 20 mm$\phi$ for example, the bending loss value (i.e., uniform bending loss) measured for this optical fiber is preferably 30 dB/m or less, and more preferably 10 dB/m or less. It is believed that under this condition production of a stable cable is possible for a variety of cable designs.

Since it enables propagation over a broad band, it is preferable to have a small value for the slope of dispersion with respect to wavelength, i.e., the dispersion slope. This is particularly true in the case of a fiber employed in wavelength multiplex transmissions. This is because when optical signals of various wavelengths are transmitted in the employed wavelength band, their propagation states tend to become uniform when the dispersion slope is small. In the present invention, there is an increased degree of freedom with respect to the design parameters. As a result, there is greater freedom permitted when setting the fiber parameters, even in the case where designing an optical fiber having a low dispersion slope that is applied as a wavelength multiplex transmission fiber.

EXAMPLES

Examples of the present invention will now be explained specifically.

The definition of normalized frequency in these examples is expressed by Equation (2). In addition, note that n1 is denoted as the maximum refractive index nA near the center part of the core. Core radius a is defined as the distance to a position where the value equals the refractive index of the cladding in the radially directed refractive index distribution.

Example 1

Figure 6:
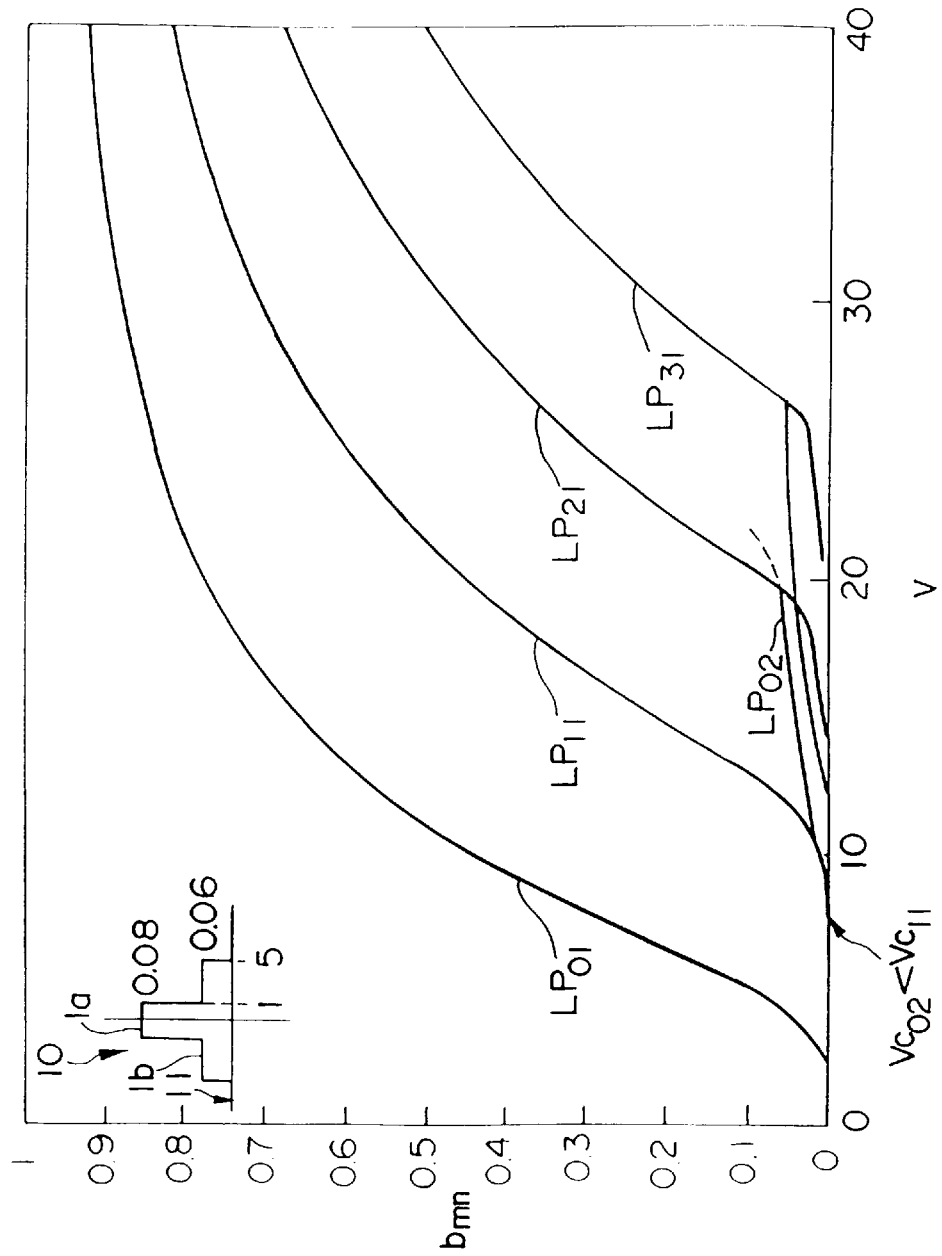
FIG. 6 is a graph showing the relationship between the normalized propagation constant bmn and the normalized frequency V of the optical fiber in Example 1.

FIG. 6 is a graph showing the results of a simulation of the relationship between the normalized propagation constant and the normalized frequency in the example of a multimode optical fiber having the step-refractive index distribution shown in FIG. 5(a). In this multimode optical fiber, the relative values of the refractive indices of center part 1a and stepped part 1b are 0.80 and 0.06 (units: %). When the radius of center part 1a is set to 1, then the radius of stepped part 1b is 5.

The upper limit VC11 for a normalized frequency within limits that permit elimination of LP mode propagation is around 8. In the case of a design that actively does not permit LP11 mode propagation, such as conventional designs, the limits for V must be smaller than the aforementioned. Thus, freedom of design is extremely narrow. In contrast, by applying the present invention, a design is possible within the range of from 8 to 15 approximately, where the LP02 mode, which is the third mode, is generated. Thus, freedom of design is increased.

For example, in the case where V is around 15, it is possible to propagate the LP11, LP02, LP21 and LP31 modes, in addition to the LP01 mode.

The difference in the normalized propagation constant between the LP01 mode and the LP11 mode is extremely large. For LP11 or higher modes, however, the normalized propagation constant difference is small.

Theoretically, the cladding mode is thought to present at the position bmn=0, with the difference in the normalized propagation constant between the cladding mode and the higher order modes becoming smaller. Accordingly, energy conversion between the LP01 mode and the LP11 mode does not readily occur, while energy conversions between higher order modes, and between higher order modes and the cladding mode, occur readily. Thus, it is understood that higher order modes are readily radiated to the outside of the core.

Figure 7:
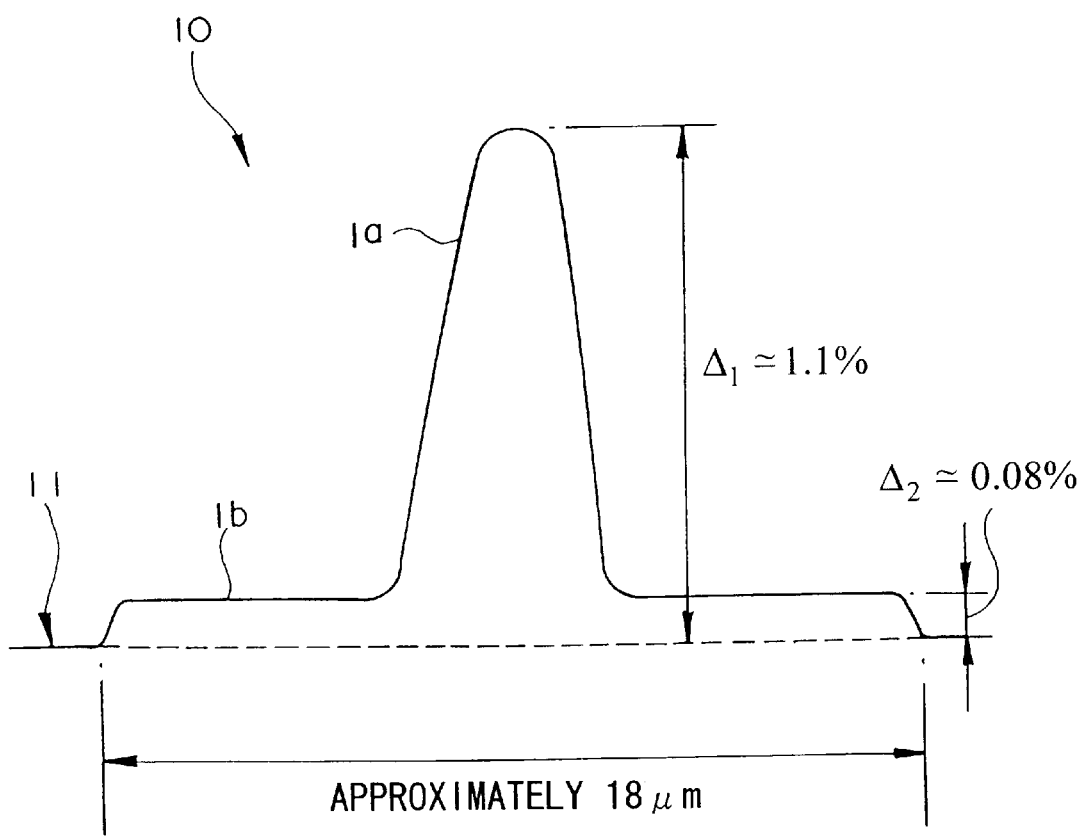
FIG. 7 is a graph showing the result obtained when the refractive index distribution of the optical fiber produced in Example 1 is measured.

A multimode optical fiber was produced using a VAD method, with the values of V and b01 set to about 15 and about 0.65 respectively. The result of measurements of this multimode optical fiber's refractive index distribution are shown in FIG. 7. As may be understood from this figure, the refractive index distribution is not a perfect step-shape. Rather, the boundaries of each of center part 1$a$, stepped part 1$b$ and cladding 11 have a rounded profile.

Using a usual method of measurement, a result of 1.75 $\mu$m is obtained for the cutoff wavelength of this multimode optical fiber at a fiber length of 2 meters, for example. From these results, it was concluded that, clearly, a multimode fiber is employed for 1.5~1.6 $\mu$m transmission, and that it is not appropriate for single mode transmission.

Figure 8A:
FIGS. 8(a) and 8(b) are explanatory figures showing the method for measuring the relationship between the fiber length for the optical fiber and the cutoff wavelength.
Figure 8B:
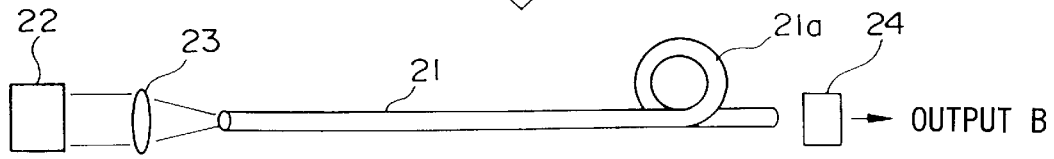
Figure 8C:
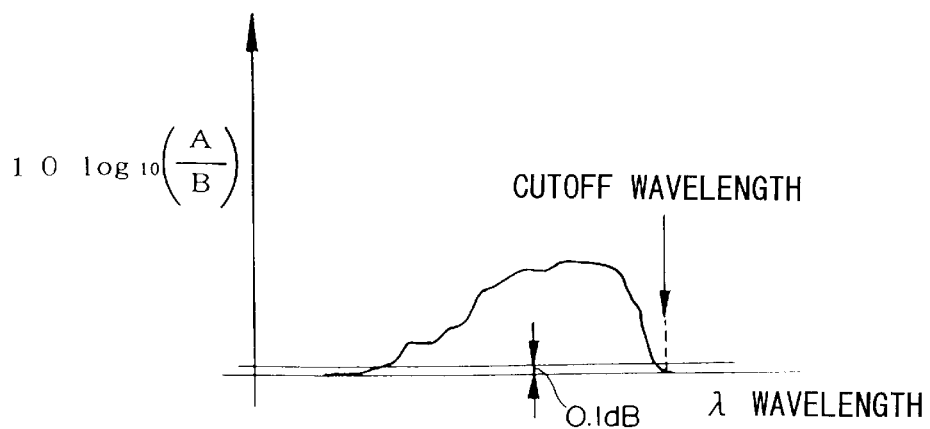
FIG. 8(c) is a diagram showing an example of a graph for obtaining the cutoff wavelength.

The relationship between fiber length and cutoff wavelength in this multimode optical fiber was measured using the method shown in FIGS. 8($a$) and 8($b$).

First, as shown in FIG. 8($a$), light of a measured wavelength from a variable wavelength light source 22 is passed through a lens 23 and employed to excite all modes in an optical fiber 21 which is in a straight orientation and is of a measured length. An optical detector 24 detects the light that passes through optical fiber 21. These results are designated as "output A". Next, a bend 21$a$ is added to optical fiber 21 near the output end of optical fiber 21, as shown in FIG. 8($b$). Optical detector 24 detects the light passing through optical fiber 21 in the same manner, and this result is designated as "output B".

Output A and output B are compared and the difference in the loss wavelength properties is measured.

When a higher order mode propagates through an optical fiber 21 that has a straight orientation and a measured length, an excessive loss occurs when a bend 21$a$ is applied to the fiber. Thus, it is possible confirm the presence of a higher order mode when a comparison of output B and output A reveals that an excessive loss has occurred.

Conversely, in the case where higher order modes are already being radiated from optical fiber 21 at this measured length, then only the LP01 mode is detected at output A. Therefore, even if a bend 21$a$ is applied to optical fiber 21, there is no increase in the loss at output B. Accordingly, the range within which the intensities of output A and output B are equal is the range within which single mode transmission is possible.

The cutoff wavelength for each fiber length can be obtained from the graph shown in FIG. 8($c$). Wavelength is shown along the horizontal axis, while A and B shown on the vertical axis indicate the light intensity of output A light and output B, respectively.

Figure 9:
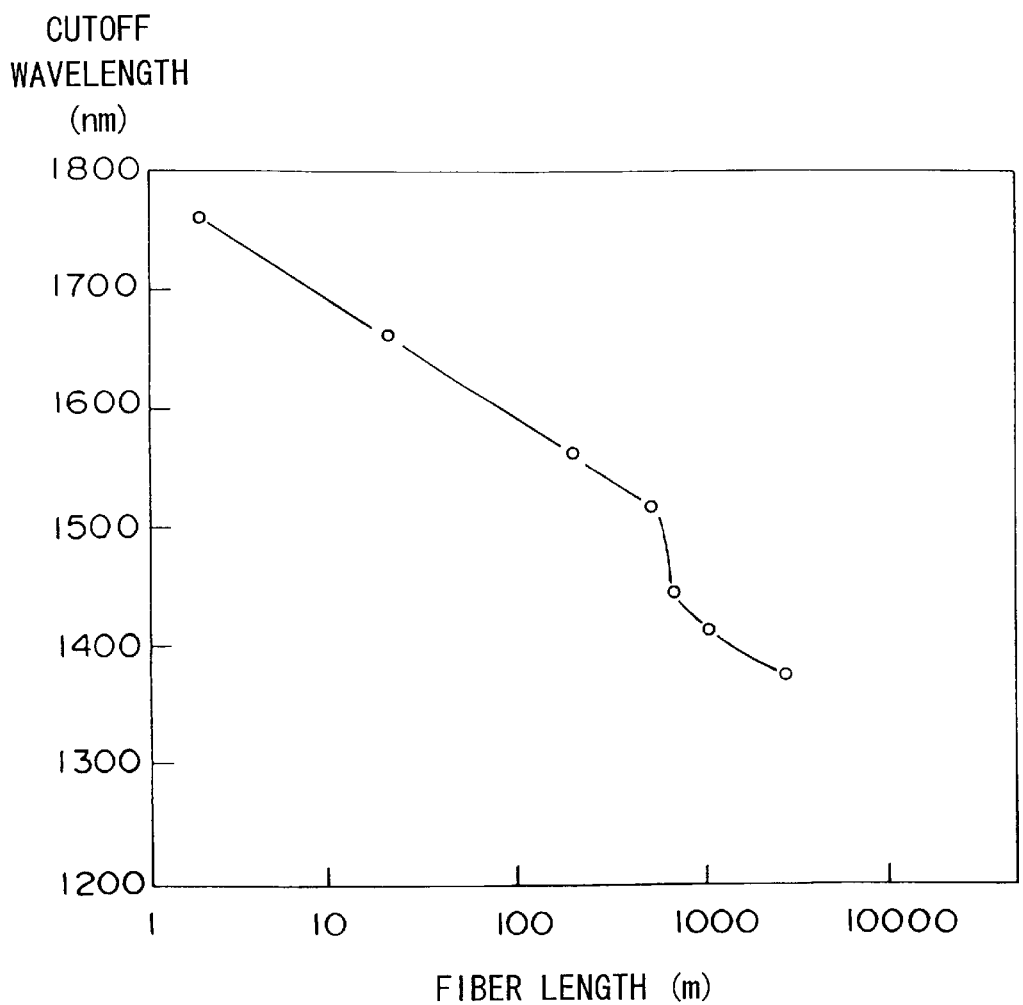
FIG. 9 is a graph showing the measured result for the relationship between the fiber length of the optical fiber in Example 1 and the cutoff wavelength.

FIG. 9 shows the results of these measurements. From these results, it may be understood that the cutoff wavelength depends greatly on the fiber length. In addition, in the present example, it is below 1.5 $\mu$m at about 3 km.

Note that the zero dispersion wavelength after a sufficiently long propagation (i.e., after propagation of 4 km or more) in this multimode optical fiber was 1.58 $\mu$m, the effective core cross sectional area in the 1.55 $\mu$m band was about 70 $\mu$m$^2$, and the dispersion slope was about 0.15 ps/km/nm$^2$. These values are sufficient for so-called "high density wavelength multimode transmission", and have properties capable of transmitting a wavelength multiplex signal of several to 100 waves in so centered in the 1530~1560 nm band over a distance of several thousand kilometers, while repeat amplifying with an optical fiber amplifier.

Energy conversion between modes depends on such factors as the coating layer of the optical fiber and how the fibers are formed into a cable. Experiments where therefore carried out to characterize the relationship between the cutoff wavelength, and the coating layer and the cabling arrangement.

Resin-coated optical fibers were formed by providing a coating layer to the 125 $\mu$m outer diameter multimode optical fiber of Example 1. The coating layer's inner layer had a Young's modulus of less than 1 kg/mm$^2$, while its outer layer had a Young's modulus of greater than 40 kg/mm$^2$. A cable was formed of these resin-coated fibers by the usual method.

The structure employed to form the cable was a tape or loose tube type. The relationship between cutoff wavelength and fiber length were measured for these cables in the same manner as the preceding method.

In regard to the cutoff wavelength's dependence on fiber length, it was observed that for a fiber length of 1 km or less, the cutoff wavelength shortened by 80~120 nm for every 10-fold increase in fiber length. Namely, there was not a large difference in the cutoff wavelength's dependence on fiber length from that prior to providing a coating layer.

Accordingly, it was understood that the multimode optical fiber of Example 1 maintains its properties even after being made into a cable and can therefore be used without problem.

Examples 2, 3

Figure 10:
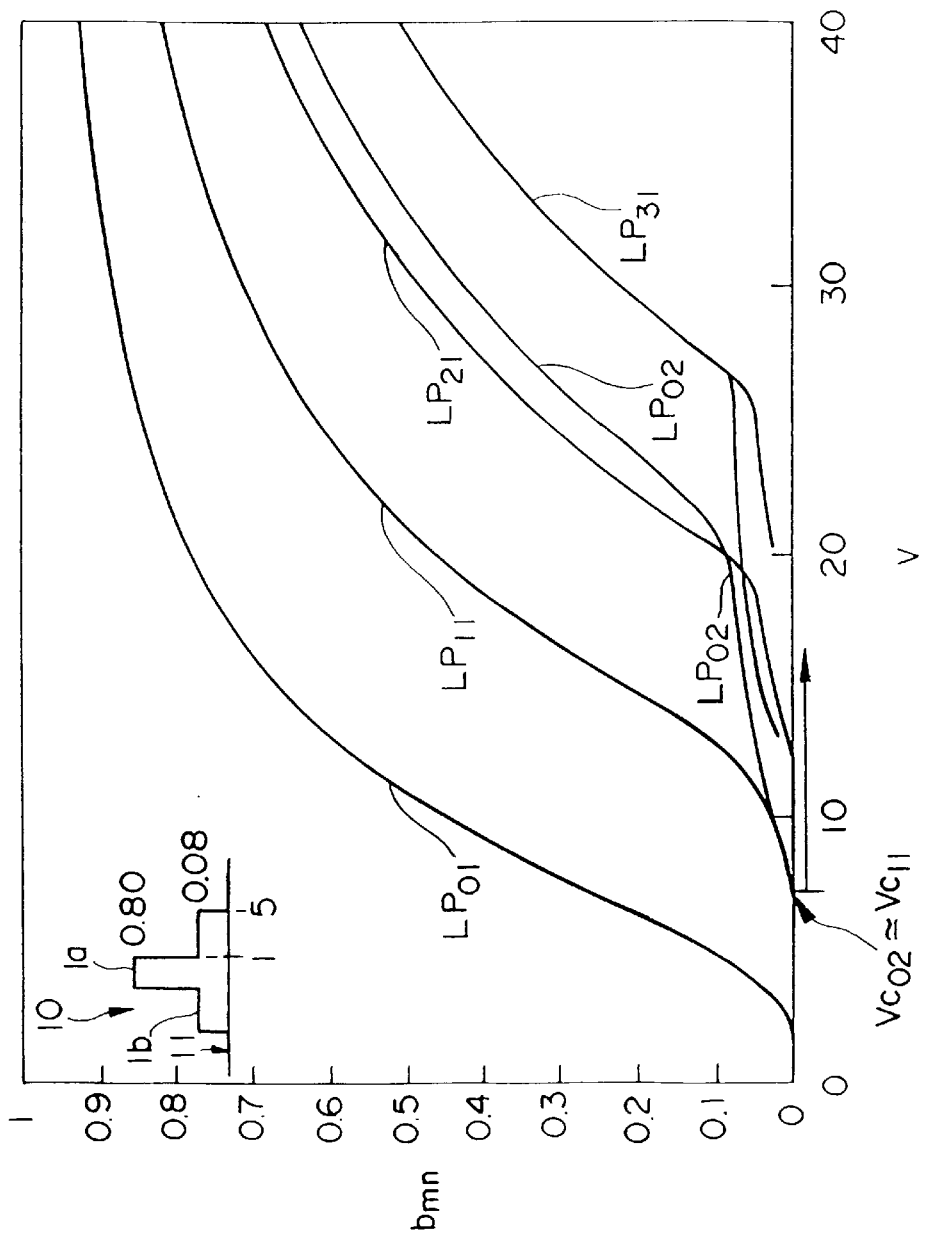
FIG. 10 is a graph showing the relationship between the normalized propagation constant bmn and the normalized frequency V of the optical fiber in Example 2.
Figure 11:
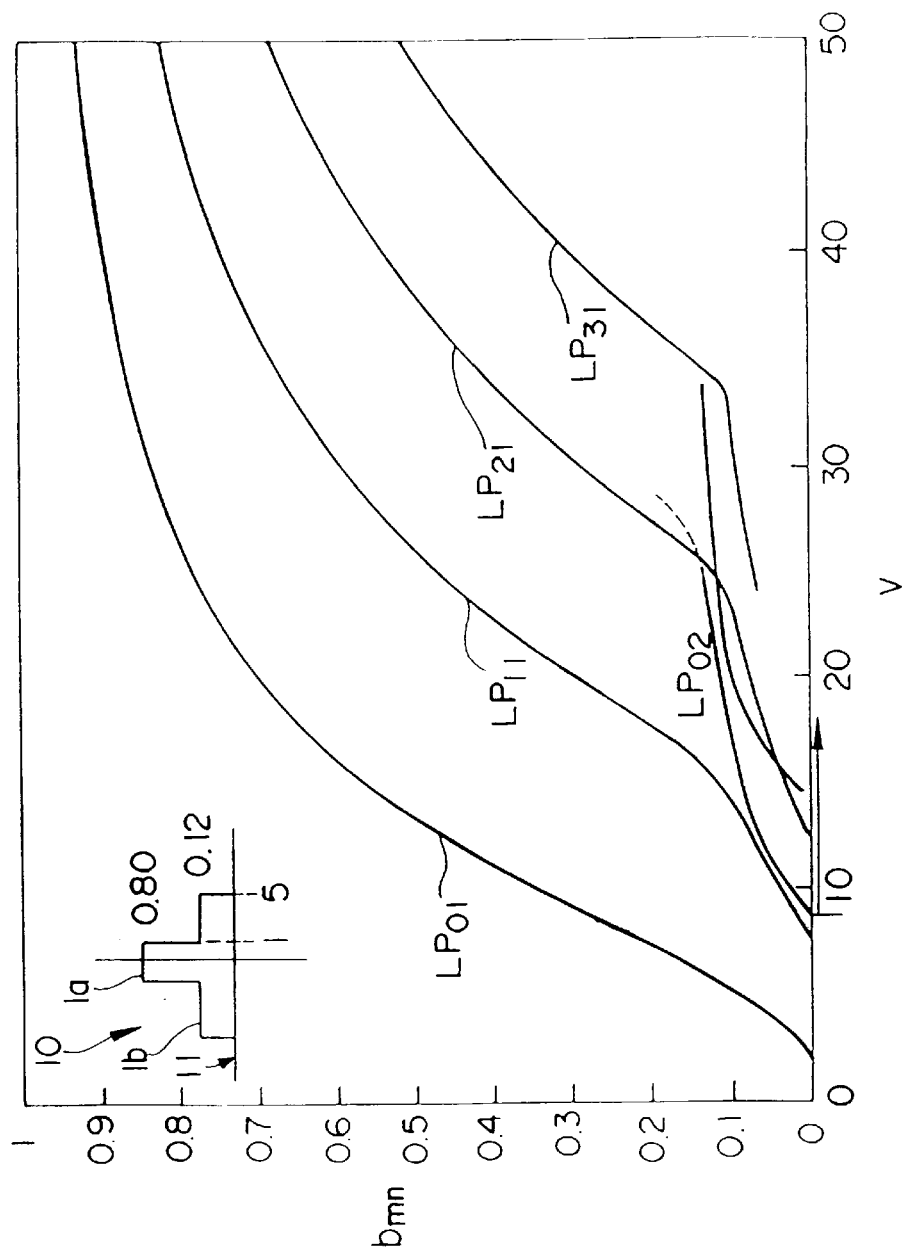
FIG. 11 is a graph showing the relationship between the normalized propagation constant bmn and the normalized frequency V of the optical fiber in Example 3.

FIGS. 10 and 11 are graphs showing the results for a simulation of the relationship between the normalized propagation constant bmn and the normalized frequency V of the multimode optical fibers from Examples 2 and 3 respectively.

As shown in their respective graphs, Examples 2 and 3 are provided with the step-refractive index distribution shown in FIG. 5($a$).

In Example 2, the relative refractive indices of center part 1$a$ and stepped part 1$b$ based on the refractive index of the cladding are 0.80% and 0.08% respectively. These values are 0.80% and 0.12% respectively in Example 3. In addition, when the radius of center part 1a is 1, then the radius of stepped part 1b is 5 in the case of both Examples 2 and 3.

Example 4

Figure 12:
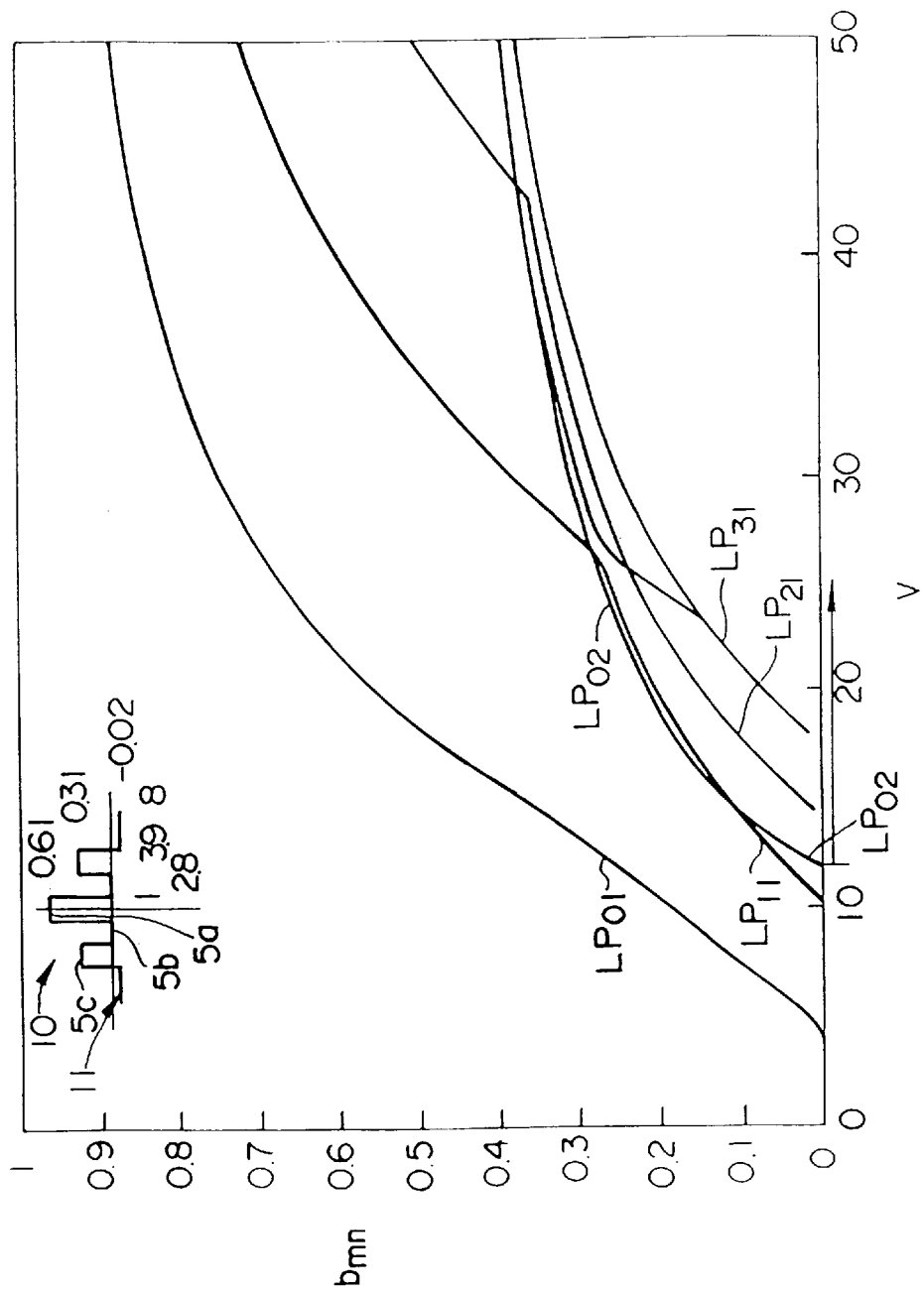
FIG. 12 is a graph showing the relationship between the normalized propagation constant bmn and the normalized frequency V of the optical fiber in Example 4.

FIG. 12 is a graph showing results for a simulation of the relationship between the normalized propagation constant bmn and the normalized frequency V of the multimode optical fiber of Example 4.

As shown in this graph, the multimode optical fiber of Example 4 is provided with the refractive index distribution shown in FIG. 5(e). The relative refractive indices of center part 5a, ring part 5c and cladding 11 based on the refractive index of intermediate part 5b are 0.61%, 0.31% and 0.02% respectively. In addition, when the radius of center part 5a is 1, then the radius of intermediate part 5b is 2.8 and the radius of ring part 5c is 3.9.

Example 5

Figure 13:
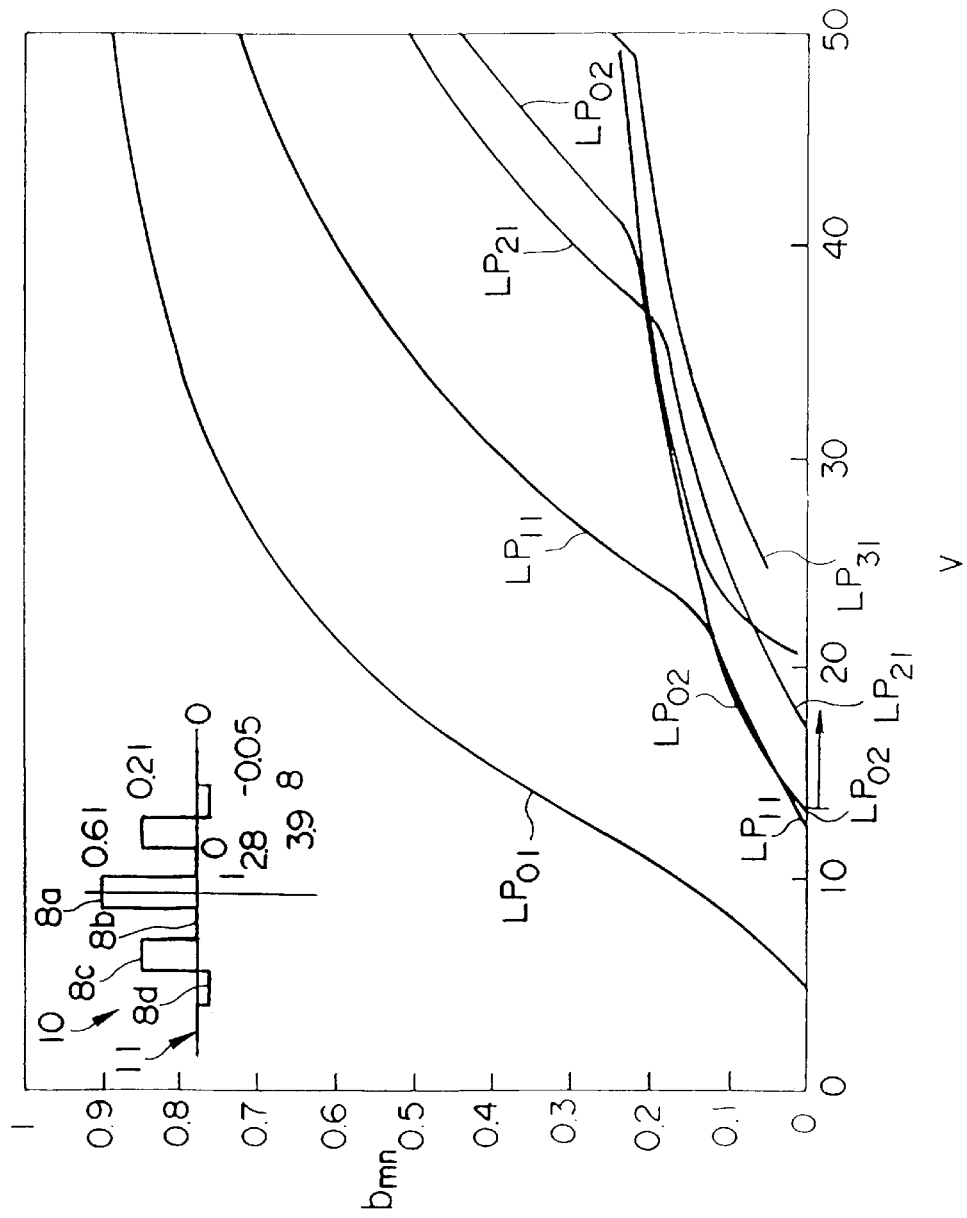
FIG. 13 is a graph showing the relationship between the normalized propagation constant bmn and the normalized frequency V of the optical fiber in Example 5.

FIG. 13 is a graph showing results for a simulation of the relationship between the normalized propagation constant bmn and the normalized frequency V of the multimode optical fiber of Example 5.

As shown in this graph, the multimode optical fiber of Example 5 is provided with the refractive index distribution shown in FIG. 5(h). The relative refractive indices of center part 8a, ring part 8c and low refractive index portion 8d based on the refractive index of intermediate part 8b and cladding 11 are 0.61%, 0.21% and −0.05% respectively. In addition, when the radius of center part 8a is 1, then the radius of intermediate part 8b is 2.8, the radius of ring part 8c is 3.9, and the radius of low refractive index part 8d is 8.

Example 6

Figure 14:
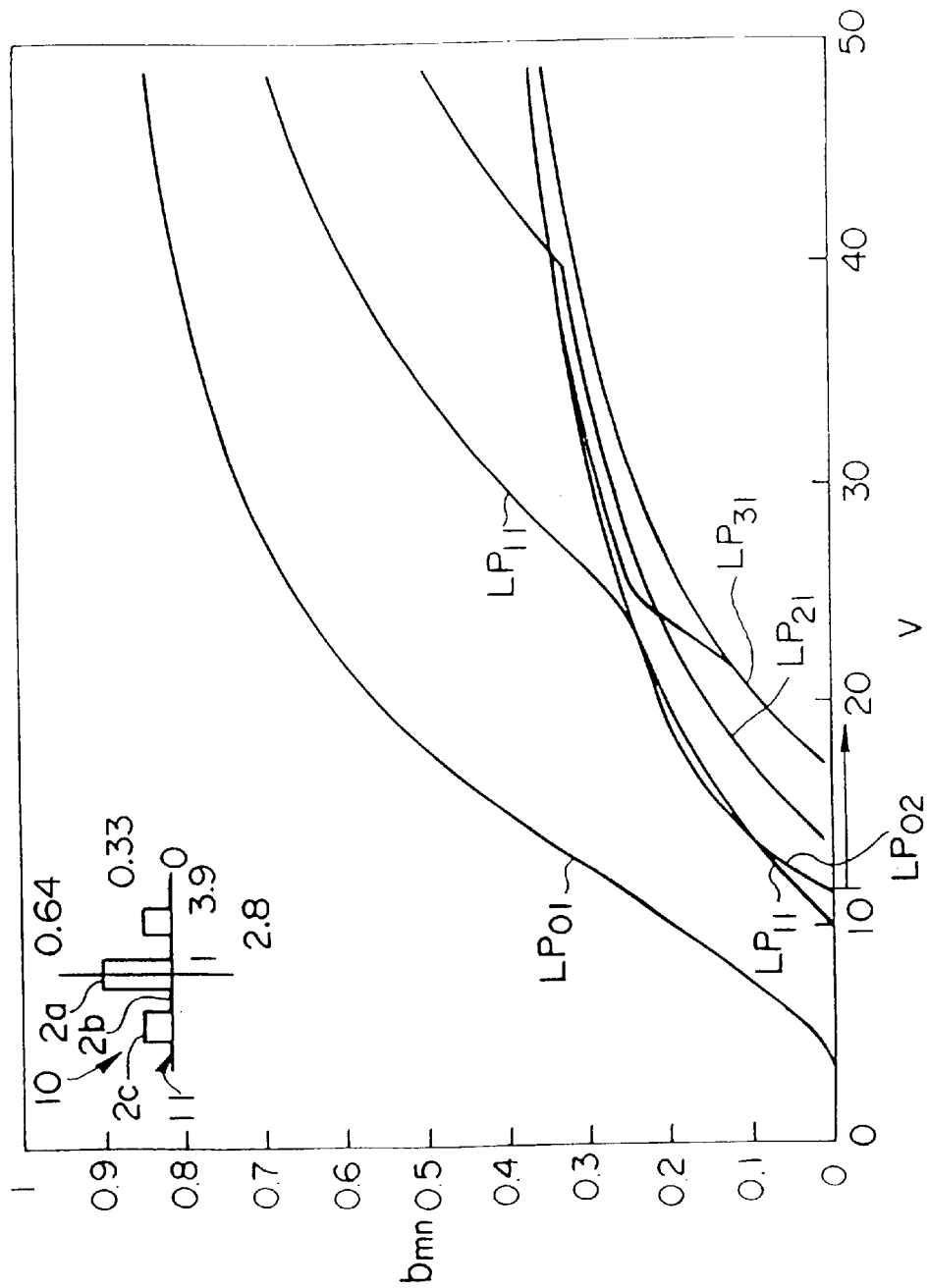
FIG. 14 is a graph showing the relationship between the normalized propagation constant bmn and the normalized frequency V of the optical fiber in Example 6.

FIG. 14 is a graph showing the results for a simulation of the relationship between the normalized propagation constant bmn and the normalized frequency V of the multimode optical fiber of Example 6.

As shown in this graph, the multimode optical fiber of Example 6 is provided with the refractive index distribution shown in FIG. 5(b). The relative refractive indices of center part 2a and ring part 2c based on the refractive index of intermediate part 2b and cladding 11 are 0.64% and 0.33% respectively. In addition, when the radius of center part 2a is 1, then the radius of intermediate part 2b is 2.8 and the radius of ring part 2c is 3.9

As may be understood from the graphs shown in FIGS. 10~14, it was possible in all case to propagate the LP11, LP02, LP21 and LP31 modes, and so on in addition to the LP01 mode, by setting the normalized frequency V to a value larger than the lower limit at which the LP02 mode is generated. In addition, the same result was obtained as in Example 1, namely, the difference in normalized propagation constants between the LP01 mode and the LP11 mode was extremely large, while the differences in normalized propagation constants between LP11 or higher modes were extremely small. Thus, it was clear that by producing a multimode optical fiber with suitable limits for the value of V, it was possible to provide a design that enables transmission under single mode conditions as the transmission distance increases, in the same manner as Example 1.

Example 7

Figure 15:
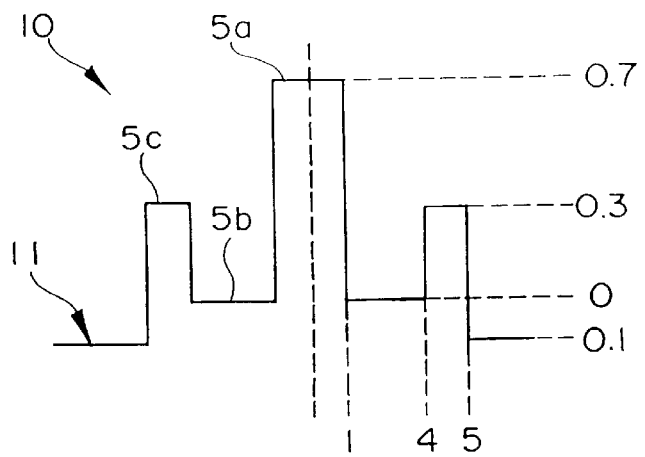
FIG. 15 is a graph showing the refractive index distribution of the optical fiber in Example 7.

As shown in FIG. 15, the multimode optical fiber of Example 7 is provided with the refractive index distribution shown in FIG. 5(e). The relative refractive indices of center part 5a, ring part 5c and cladding 11 based on the refractive index of intermediate part 5b are 0.7%, 0.3% and −0.1% respectively. In addition, when the radius of center part 5a is 1, then the radius of intermediate part 5b is 4 and the radius of ring part 5c is 5.

Figure 16:
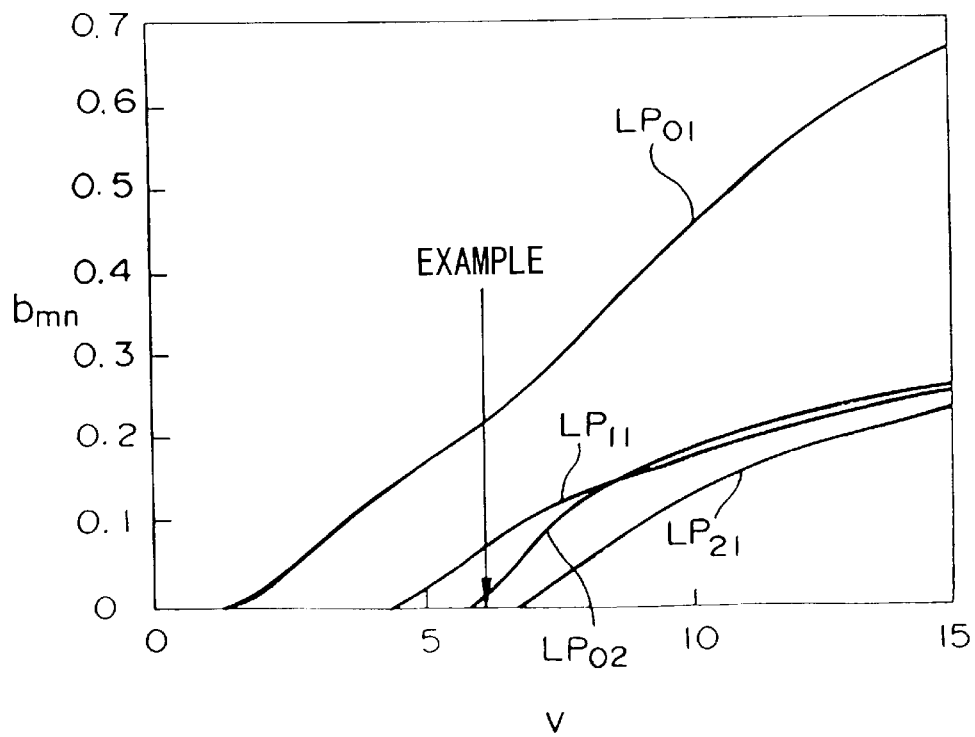
FIG. 16 is a graph showing the relationship between the normalized propagation constant bmn and the normalized frequency V of the optical fiber in Example 7.

FIG. 16 is a graph showing results of a simulation of the relationship between the normalized propagation constant bmn and the normalized frequency V of the multimode optical fiber of Example 7.

As shown in FIG. 16, a multimode optical fiber was actually produced by setting the value of V to 6.1 and employing an inside vapor phase oxidation method referred to as an MCVD method. Although there were slight variations in the shape of the fiber, measurement of the refractive index distribution revealed that the refractive index obtained approached the ideal shape shown in FIG. 15.

The measured values for the properties of this multimode optical fiber were as shown below. Theoretical values and the measured values were equivalent within an error of a few percent.

| | |
|---|---|
| core diameter (outer diameter of ring part 5c) | 16.3 $\mu$m |
| normalized frequency | V = 6.1 |
| normalized propagation constant | b01 = 0.22 |
| relative refractive index difference of core center | 0.8% |
| zero dispersion wavelength | 1550 nm |
| dispersion value ($\lambda$: 1550 nm) | 2.0 ps/km/nm |
| higher order mode cutoff wavelength (2 m fiber length) | About 1.81 $\mu$m |
| MFD | 10.2 $\mu$m |
| $A_{eff}$ | 89.5 $\mu m^2$ |
| LP01 mode bending loss | About 23 dB/m (bending diameter 20 mm) |
| wavelength dispersion slope ($\lambda$: 1550 nm) | About 0.133 ps/km/nm$^2$ |

Figure 17:
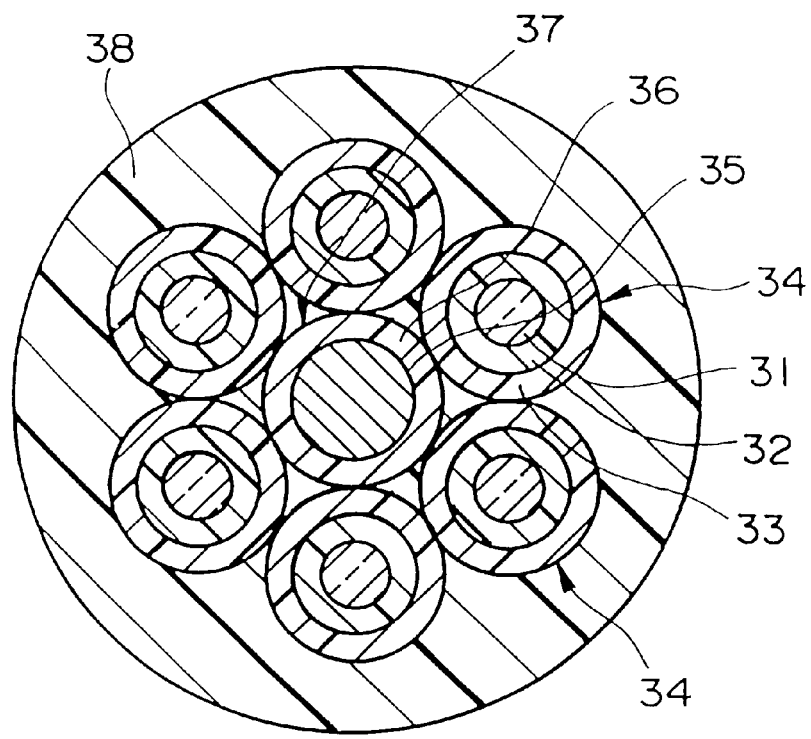
FIG. 17 is a cross-sectional diagram of the unit formed using the optical fiber in Example 7.

As shown in FIG. 17, a resin-coated optical fiber 34 is formed of this 125 $\mu$m outer diameter multimode optical fiber by providing a coating layer, consisting of a UV curable resin having a soft inner layer 32 (approximately 35 $\mu$m thick) with a Young's modulus of 0.10 kg/mm$^2$ and a hard outer layer 33 (approximately 27 $\mu$m thick) with a Young's modulus of 60 kg/mm$^2$, to the outer periphery of multimode optical fiber 31. Six of these resin-coated optical fibers 34 are twisted around the outside of a tension member 37 in which a coating layer 36 consisting of polyethylene has been provided on to a steel wire 35, to form an aggregate member. A six core unit structure is then formed by providing a coating layer 38 around this aggregate member. The higher order mode cutoff wavelength of this unit was measured, and the cutoff wavelength of each multimode optical fiber 31 at a position at approximately 2 km of the unit length was found to have shortened 1.50 $\mu$m.

Accordingly, the cutoff wavelength when the fiber length is 2 m is approximately 1.81 $\mu$m. Based on these values alone, the six core unit structure would not be deemed appropriate for practical applications. However, it was possible to confirm that single mode propagation could be carried out by maintaining a specific fiber length. Moreover, this multimode optical fiber had a large $A_{eff}$ of almost 90 $\mu m^2$, making it possible to reduce the power density of the optical signal in this multimode optical fiber and inhibit nonlinear effects.

Example 8

Figure 18:
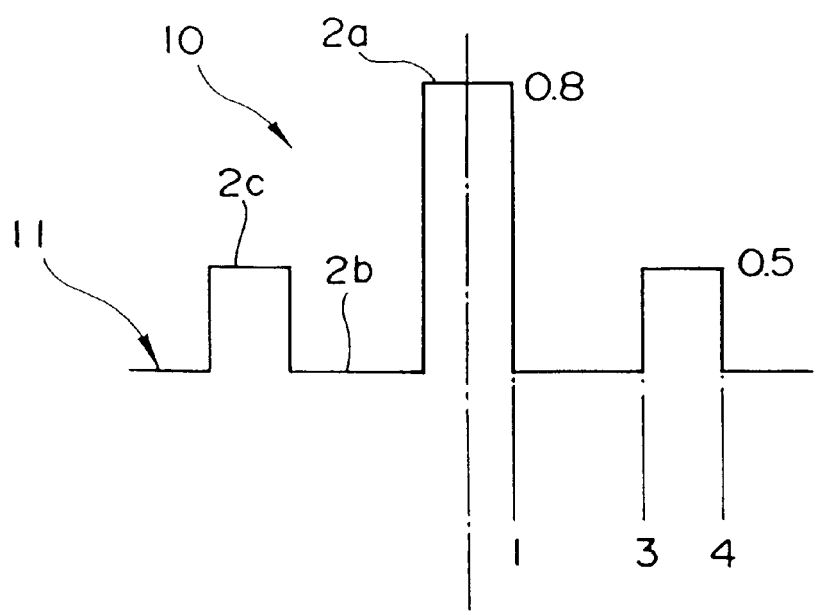
FIG. 18 is a graph showing the refractive index distribution of the optical fiber in Example 8.

As shown in FIG. 18, the multimode optical fiber of Example 8 is provided with the refractive index distribution shown in FIG. 5(b). The relative refractive indices of center part 2a and ring part 2c based on the refractive index of intermediate part 2b and cladding 11 are 0.8% and 0.5% respectively. In addition, when the radius of center part 2a is 1, then the radius of intermediate part 2b is 3 and the radius of ring part 2c is 4.

Figure 19:
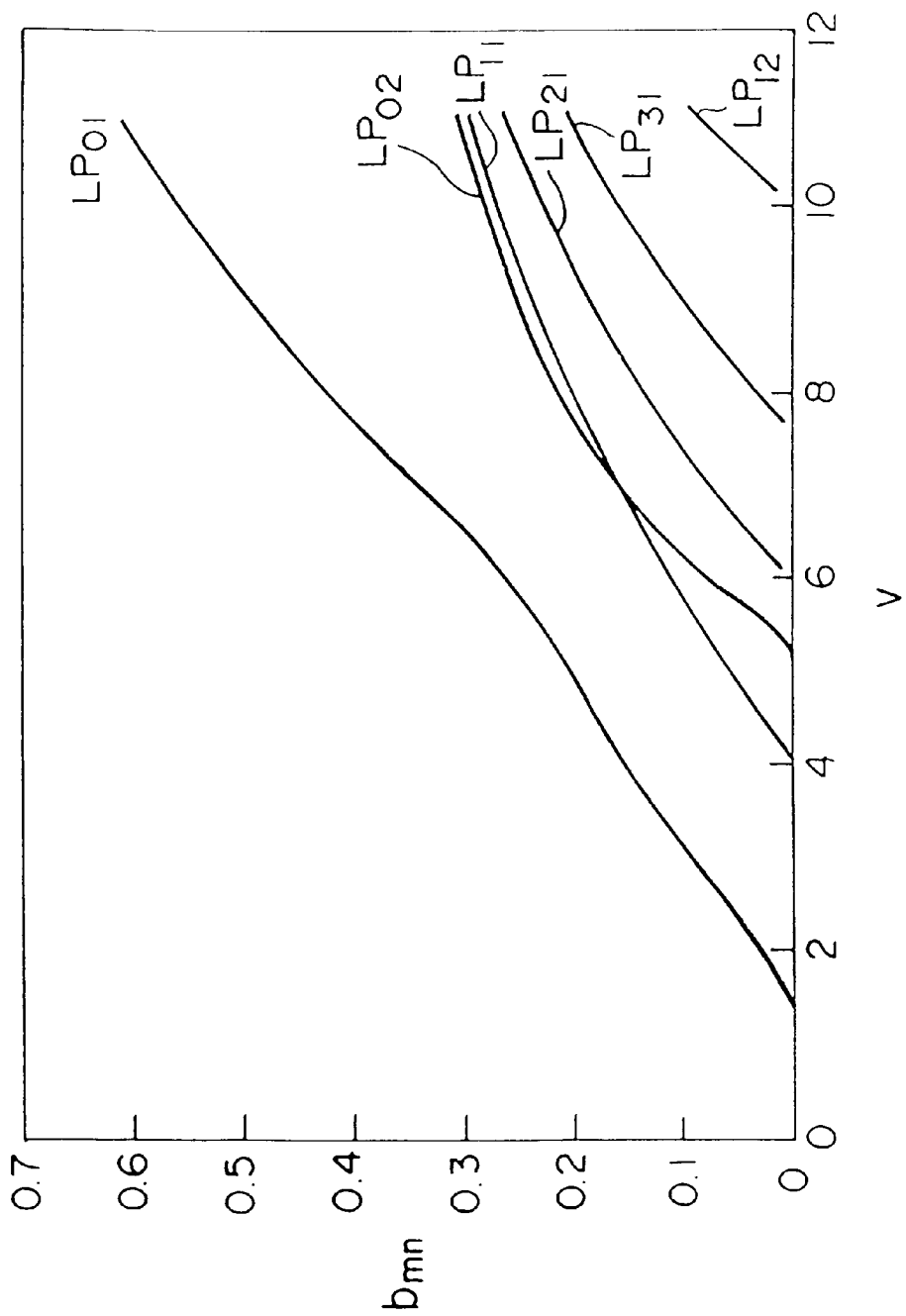
FIG. 19 is a graph showing the relationship between the normalized propagation constant bmn and the normalized frequency V of the optical fiber in Example 8.

FIG. 19 is a graph showing results of a simulation of the relationship between the normalized propagation constant bmn and the normalized frequency V of the multimode optical fiber of Example 8.

A multimode optical fiber was produced actually by setting the value of V to 5.4 and employing an inside vapor phase oxidation method referred to as a MCVD method, in the same manner as in Example 7.

The measured values for the properties of this multimode optical fiber were as shown below. Theoretical values and the measured values were equivalent within an error of a few percent.

| | |
|---|---|
| core diameter (outer diameter of ring part 2c) | 14.6 $\mu$m |
| normalized frequency | V = 5.4 |
| normalized propagation constant | b01 = 0.23 |
| relative refractive index difference of core center | 0.8% |
| zero dispersion wavelength | 1564 nm |
| dispersion value ($\lambda$: 1550 nm) | 2.0 ps/km/nm |
| higher order mode cutoff wavelength (2 m fiber length) | About 1.87 $\mu$m |
| MFD | 9.7 $\mu$m |
| $A_{eff}$ | 93.9 $\mu$m$^2$ |
| LP01 mode bending loss | About 15 dB/m (bending diameter 20 mm) |
| wavelength dispersion slope ($\lambda$: 1550 nm) | About 0.133 ps/km/nm$^2$ |

In the same manner as in Example 7, these multimode optical fibers were rendered into a unit as shown in FIG. 17. The higher order mode cutoff wavelength of this unit was measured, and a value of less than 1500 nm was obtained at transmission point of 4 km, making it possible to confirm that single mode propagation could be carried out. In addition, as in the preceding, the $A_{eff}$ was large and there was a superior effect with respect to inhibiting nonlinear effects.

Example 9

In addition to the method shown in FIGS. 8(a) and 8(b), a method employing a reflective fiber grating may be cited as an example of a method for confirming the presence of a plurality of propagating modes in a multimode optical fiber.

A design is employed for the fiber grating in which a pertuebation, such as a periodic change in the diameter or refractive index of the core, is formed in the direction of the fiber's length. By employing this periodic change, the property of reflecting light of a specific wavelength band can be obtained.

Figure 20A:
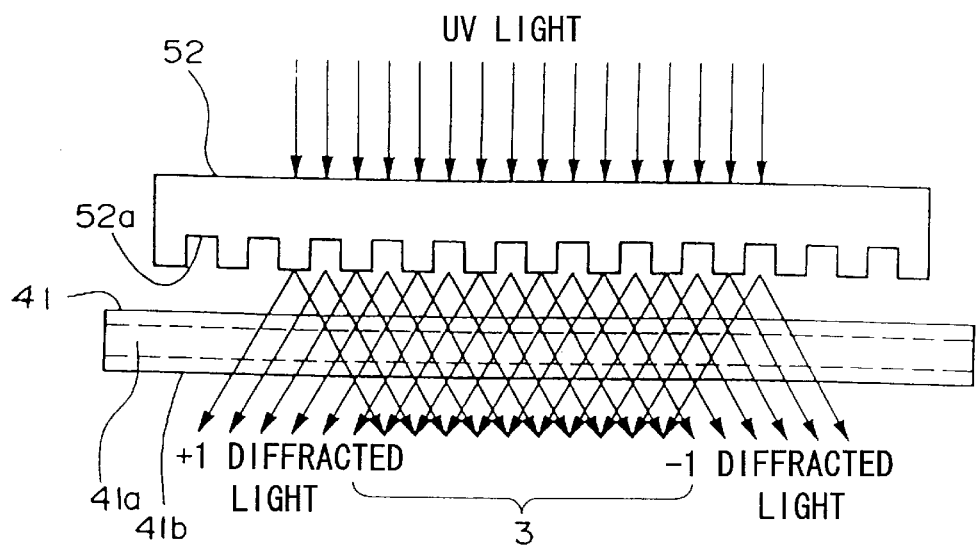
FIG. 20(*a*) is an explanatory diagram showing one example of the method for manufacturing a fiber grating.

FIG. 20(a) is an explanatory figure showing one example of the method for producing a fiber grating. This method makes use of the characteristic that the refractive index rises when germanium-doped quartz glass is irradiated with ultraviolet light of a specific wavelength (i.e., the so-called "photo-refractive effect").

At least the high refractive index portion near the center of core 41a of optical fiber 41 consists of germanium-doped quartz glass. The other parts of core 41a are formed of pure quartz glass or fluorine-doped quartz glass. Cladding 41b consists of pure quartz glass or fluorine-doped quartz glass.

Numeral 52 in the figure indicates a phase mask. This phase mask 52 consists of quartz glass, and so on. A plurality of lattices 52a. . . , are formed with a specific period to one surface of phase mask 52.

Phase mask 52 is disposed so that the surface on which lattices 52a. . . are formed faces the lateral surface of optical fiber 41. This lateral surface of optical fiber 41 is irradiated with ultraviolet light which passes through phase mask 52.

As a result, a +1 diffracted light and a −1 diffracted light are diffracted by lattices 52a. . . and a Interference fringes pattern are generated, to form the intensity pattern of the UV light. The refractive index of core 41a in the portion where the interference fringes were generated changes as a result, and the UV light intensity pattern is transferred to core 41a as a semi-permanent change in the refractive index of core 41a. In this way, a grating part 43 is obtained in which a periodic change in the refractive index of core 41a has been formed in the direction of the length of optical fiber 41.

Figure 20B:
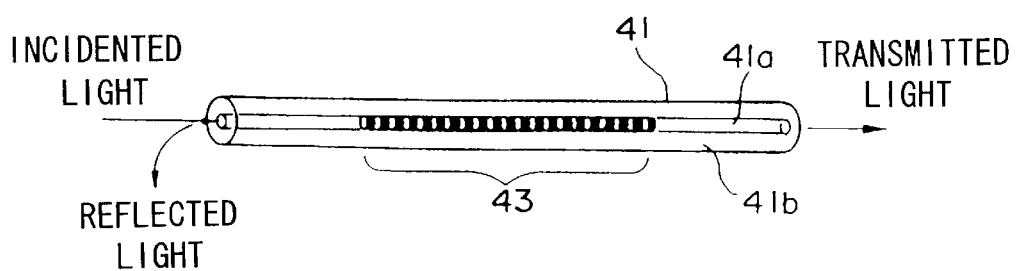

As shown in FIG. 20(b), when light incidents on optical fiber 41, light of a specific wavelength is reflected at grating part 43. As a result, transmitted light from which light of this specific wavelength has been lost is obtained.

The wavelength of this reflected light is dependent on the period of the changes in the refractive index (i.e., the refractive index perturbation). In other words, when the mode's wavelength within optical fiber 41 and the period of ½ of the refractive index perturbation are equal, an extremely strong reflection occurs. Accordingly, by measuring this reflected wavelength, it is possible to confirm the mode propagating through optical fiber 41 with certainty.

Figure 21:
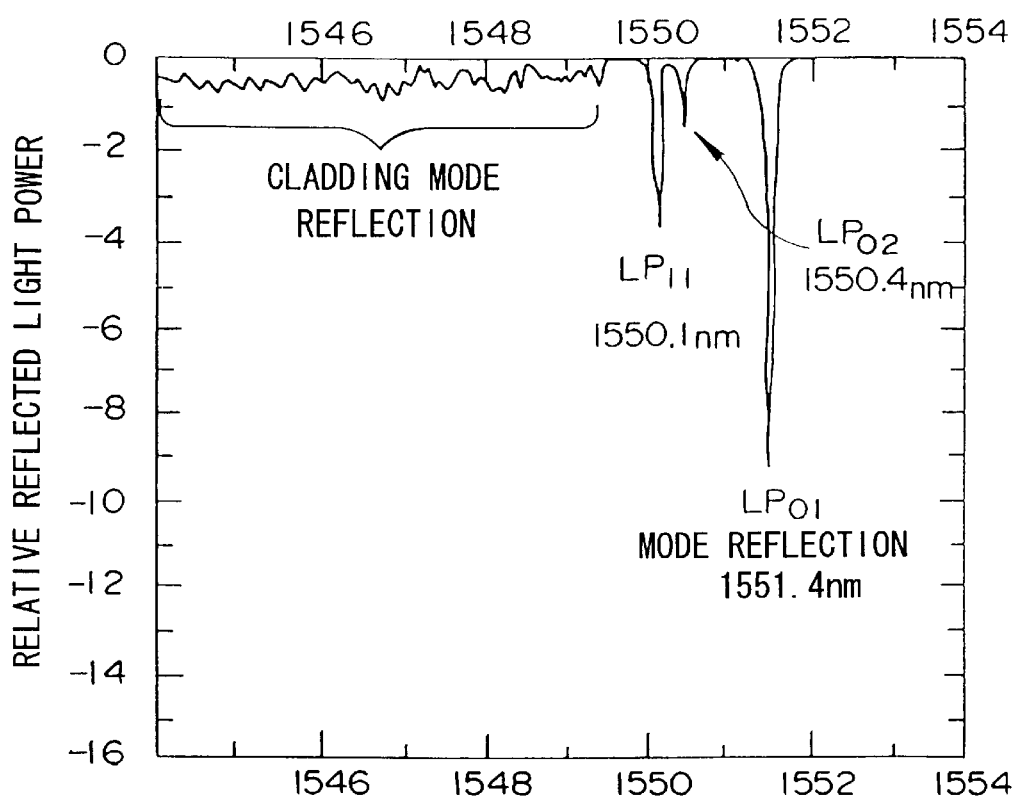
FIG. 21 is a graph showing the measured result for the reflection spectrum of the fiber grating in Example 9.

FIG. 21 is a reflection spectrum obtained when the reflection wavelength characteristics were measured for a fiber grating in which a UV laser (excimer laser) was used to form a grating part of a short period of about 0.5 $\mu$m to a multimode optical fiber having a refractive index distribution resembling that of Example 6. If there is only one propagating mode, then it is only possible to measure one reflection spectrum. In this example, however, reflection spectrums for a plurality of modes other than the LP01 mode were measured, making it possible to confirm the propagation of a plurality of modes.

INDUSTRIAL APPLICABILITY

As explained above, the present invention's multimode optical fiber with a higher order mode removing function enables single mode propagation after propagating over a specific distance. Thus, the conventional single mode conditions are relaxed, so that fiber parameters can be set relatively freely.

As a result, despersion in the employed wavelength band can be reduced. In addition, the effective core cross-sectional area can be increased. Thus, it is possible to anticipate a reduction loss, bending loss and nonlinear effects.

Increasing the degree of freedom in design parameters in this way is beneficial in the design of optical fibers used in long-distance transmission or optical fibers used in wavelength multiplexing transmission.

What is claimed is:

1. A multimode optical fiber with a higher order mode removing function, wherein at least three or more linearly polarized wave modes can exist as propagating modes when an optical signal incidents, characterized in that:

said propagating modes include the lowest order mode and second or higher order modes; and the difference between the propagation constants of said lowest order mode and said second order mode is 2-fold or more than the difference between the propagation constants of adjacent modes that are second or higher order modes.

2. A multimode optical fiber with a higher order mode removing function according to claim 1, characterized in that the difference in the normalized propagation constant between adjacent modes in the second or higher order modes and a cladding mode is 0.25 or less.

3. A multimode optical fiber with a higher order mode removing function according to claim 1, characterized in that:

said multimode optical fiber is provided with a core and a cladding which is around and in contact with said core; and said core consists of two or more layers provided in a concentric form, and is equipped with a maximum refractive index layer that has the highest refractive index and is provided near the center of said core, and an intermediate layer that has a refractive index that is lower than that of said maximum refractive index layer and is around and in contact with said maximum refractive index layer.

4. A multimode optical fiber with a higher order mode removing function according to claim 3, characterized in that the maximum value of the relative refractive index based on the cladding of the intermediate layer is 5~90% of the relative refractive index based on the cladding of the maximum refractive index layer.

5. A multimode optical fiber with a higher order mode removing function according to claim 3, characterized in that the relative refractive index difference based on the refractive index of the cladding of the maximum refractive index layer is in the range of 0.65~1.5%.

6. A multimode optical fiber with a higher order mode removing function according to claim 3, characterized in that the outer diameter of the core is 3~8-fold greater than the outer diameter of said maximum refractive index layer.

7. A multimode optical fiber with a higher order mode removing function according to claim 3, characterized in that the outer diameter of the core is 3~5.5-fold greater than the outer diameter of said maximum refractive index layer.

8. A multimode optical fiber with a higher order mode removing function according to claim 3, characterized in that:

the intermediate layer consists of one layer or two or more layers having different refractive indices, and, when the refractive indices of the layers forming said intermediate layer are designated nl1, nl2, . . . , nli (i=2, 3, . . . ) starting from the inside, then nl1>nli; and the cladding is provided with a refractive index lower than nl1.

9. A multimode optical fiber with a higher order mode removing function according to claim 8, characterized in that the maximum value of the relative refractive index based on the cladding of the intermediate layer is 5~50% of the relative refractive index based on the cladding of the maximum refractive index layer.

10. A multimode optical fiber with a higher order mode removing function according to claim 3, characterized in that:

the intermediate layer consists of two or more layers having different refractive indices, and, with respect to the layers forming said intermediate layer, when the refractive index of the layer adjacent to the maximum refractive index layer is designated nl1 and the maximum refractive index of these layers is designated nlmax, then nlmax>nl1; and the cladding is provided with a refractive index lower than nlmax.

11. A multimode optical fiber with a higher order mode removing function according to claim 10, characterized in that the maximum value of the relative refractive index based on the cladding of the intermediate layer is 15~90% of the relative refractive index based on the cladding of the maximum refractive index layer.

12. A multimode optical fiber with a higher order mode removing function according to claim 1, characterized in that modes other than the lowest order mode are attenuated during the time that an incidented light signal is propagating a maximum of 4 km, and essentially do not contribute to data transmission.

13. A multimode optical fiber with a higher order mode removing function according to claim 1, characterized in that the effective core cross sectional area in the 1.55 $\mu$m band is 50 $\mu m^2$ or more, the absolute value of dispersion in 1.55 $\mu$m band is 10 ps/km/nm or less, and the main component is quartz glass.

14. A multimode optical fiber with a higher order mode removing function according to claim 13, characterized in that the effective core cross sectional area in the 1.55 $\mu$m band is 70 $\mu m^2$ or more.

15. A multimode optical fiber with a higher order mode removing function according to claim 14, characterized in that the absolute value of dispersion in 1.55 $\mu$m band is 5 ps/km/nm or less.

16. A multimode optical fiber with a higher order mode removing function according to claim 1, characterized in that the number of propagating modes is 3~6.

17. A multimode optical fiber with a higher order mode removing function according to claim 1, characterized in that in the employed wavelength band, dispersion of the lowest order mode becomes zero at a wavelength longer than 1.5 $\mu$m.

18. A multimode optical fiber with a higher order mode removing function according to claim 1, characterized in that the uniform bending loss for a diameter of 20 mm in the employed wavelength band is 30 dB/m or less.

19. A multimode optical fiber with a higher order mode removing function according to claim 1, characterized in that the uniform bending loss for a diameter of 20 mm in the employed wavelength band is 10 dB/m or less.

20. A multimode optical fiber with a higher order mode removing function according to claim 1, characterized in that in the employed wavelength band, dispersion of the lowest order mode becomes zero at a wavelength shorter than 1.5 $\mu$m.

* * * * *